US010496186B2

(12) United States Patent
Yasuda et al.

(10) Patent No.: US 10,496,186 B2
(45) Date of Patent: Dec. 3, 2019

(54) INFORMATION PROCESSING APPARATUS, INFORMATION PROCESSING METHOD, AND PROGRAM

(71) Applicant: SONY CORPORATION, Tokyo (JP)

(72) Inventors: Ryouhei Yasuda, Kanagawa (JP); Takuro Noda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 50 days.

(21) Appl. No.: 15/566,901

(22) PCT Filed: Apr. 19, 2016

(86) PCT No.: PCT/JP2016/062403
§ 371 (c)(1),
(2) Date: Oct. 16, 2017

(87) PCT Pub. No.: WO2016/208261
PCT Pub. Date: Dec. 29, 2016

(65) Prior Publication Data
US 2018/0129303 A1    May 10, 2018

(30) Foreign Application Priority Data

Jun. 26, 2015 (JP) .............................. 2015-129163

(51) Int. Cl.
*G06F 3/0346* (2013.01)
*G06F 3/16* (2006.01)
(Continued)

(52) U.S. Cl.
CPC .......... *G06F 3/0346* (2013.01); *A63F 13/213* (2014.09); *A63F 13/215* (2014.09);
(Continued)

(58) Field of Classification Search
CPC .... A63F 13/213; A63F 13/215; A63F 13/219; A63F 13/40; A63F 13/42; A63F 13/45;
(Continued)

(56) References Cited

U.S. PATENT DOCUMENTS 4,847,605 A * 7/1989 Callahan ............. G06F 3/04842
715/856
5,386,494 A * 1/1995 White ..................... G06F 3/167
704/231
(Continued)

FOREIGN PATENT DOCUMENTS

JP      09-251342 A      9/1997
JP      11-184621 A      7/1999
(Continued)

*Primary Examiner* — Mihir K Rayan
(74) *Attorney, Agent, or Firm* — Paratus Law Group, PLLC

(57) ABSTRACT

There is provided an information processing apparatus, an information processing method, and a program related to the information processing apparatus, which are capable of suppressing an uncomfortable feeling of the user for a position at which processing related to the user operation is performed, the information processing apparatus including: an input unit configured to obtain line-of-sight information related to a line of sight of a user and a detection result of a user operation; and a position deciding unit configured to decide an operation position at which a process related to the user operation is performed, on the basis of the line-of-sight information obtained at a second point of time specified on the basis of a first point of time prior to a detection start of the user operation.

19 Claims, 13 Drawing Sheets

(51) Int. Cl.
*A63F 13/837* (2014.01)
*A63F 13/219* (2014.01)
*G06F 3/0487* (2013.01)
*A63F 13/42* (2014.01)
*A63F 13/215* (2014.01)
*A63F 13/40* (2014.01)
*G06F 3/01* (2006.01)
*A63F 13/213* (2014.01)
*A63F 13/55* (2014.01)
*G06F 3/038* (2013.01)
*A63F 13/45* (2014.01)

(52) U.S. Cl.
CPC ............ *A63F 13/219* (2014.09); *A63F 13/40* (2014.09); *A63F 13/42* (2014.09); *A63F 13/55* (2014.09); *A63F 13/837* (2014.09); *G06F 3/013* (2013.01); *G06F 3/017* (2013.01); *G06F 3/038* (2013.01); *G06F 3/0487* (2013.01); *G06F 3/16* (2013.01); *G06F 3/167* (2013.01); *A63F 13/45* (2014.09)

(58) Field of Classification Search
CPC ........ A63F 13/55; A63F 13/837; G06F 3/013; G06F 3/017; G06F 3/0346; G06F 3/038; G06F 3/0487; G06F 3/16
See application file for complete search history.

(56) References Cited

U.S. PATENT DOCUMENTS

| | | | | |
|---|---|---|---|---|
| 5,554,980 | A * | 9/1996 | Hashimoto | G06F 3/0304 340/12.55 |
| 5,689,619 | A * | 11/1997 | Smyth | G02B 27/0093 706/45 |
| 6,587,131 | B1 * | 7/2003 | Nakai | G06F 3/04812 715/857 |
| 6,724,368 | B2 * | 4/2004 | Strubbe | G06F 3/0304 345/156 |
| 6,867,790 | B1 * | 3/2005 | Brooks | G06F 3/04812 345/157 |
| 2002/0186351 | A1 * | 12/2002 | Gnanamgari | G06F 3/0386 353/42 |
| 2010/0039383 | A1 * | 2/2010 | Kadoi | G06F 3/0325 345/158 |
| 2010/0214747 | A1 * | 8/2010 | Jacobs | F21V 21/096 361/729 |
| 2015/0153834 | A1 * | 6/2015 | Akiyama | G06F 3/017 345/156 |

FOREIGN PATENT DOCUMENTS

| | | |
|---|---|---|
| JP | 2012-221498 A | 11/2012 |
| JP | 2013-242671 A | 12/2013 |
| JP | 2013-255781 A | 12/2013 |
| WO | WO2014/103217 A1 | 7/2014 |

* cited by examiner

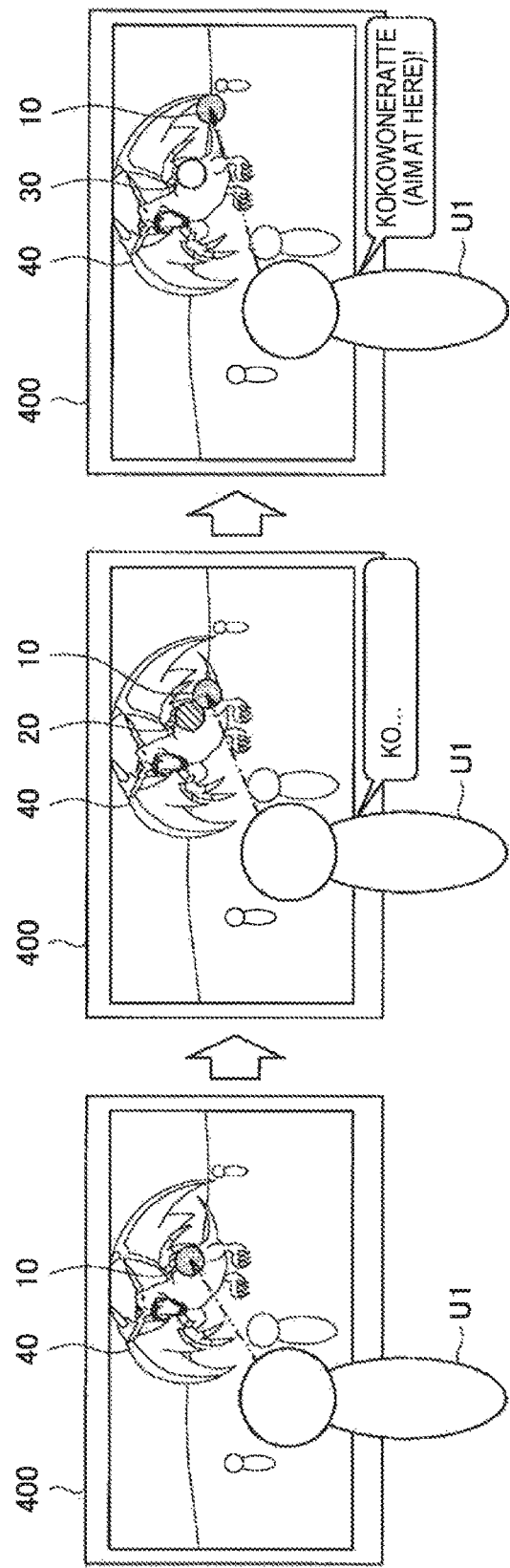

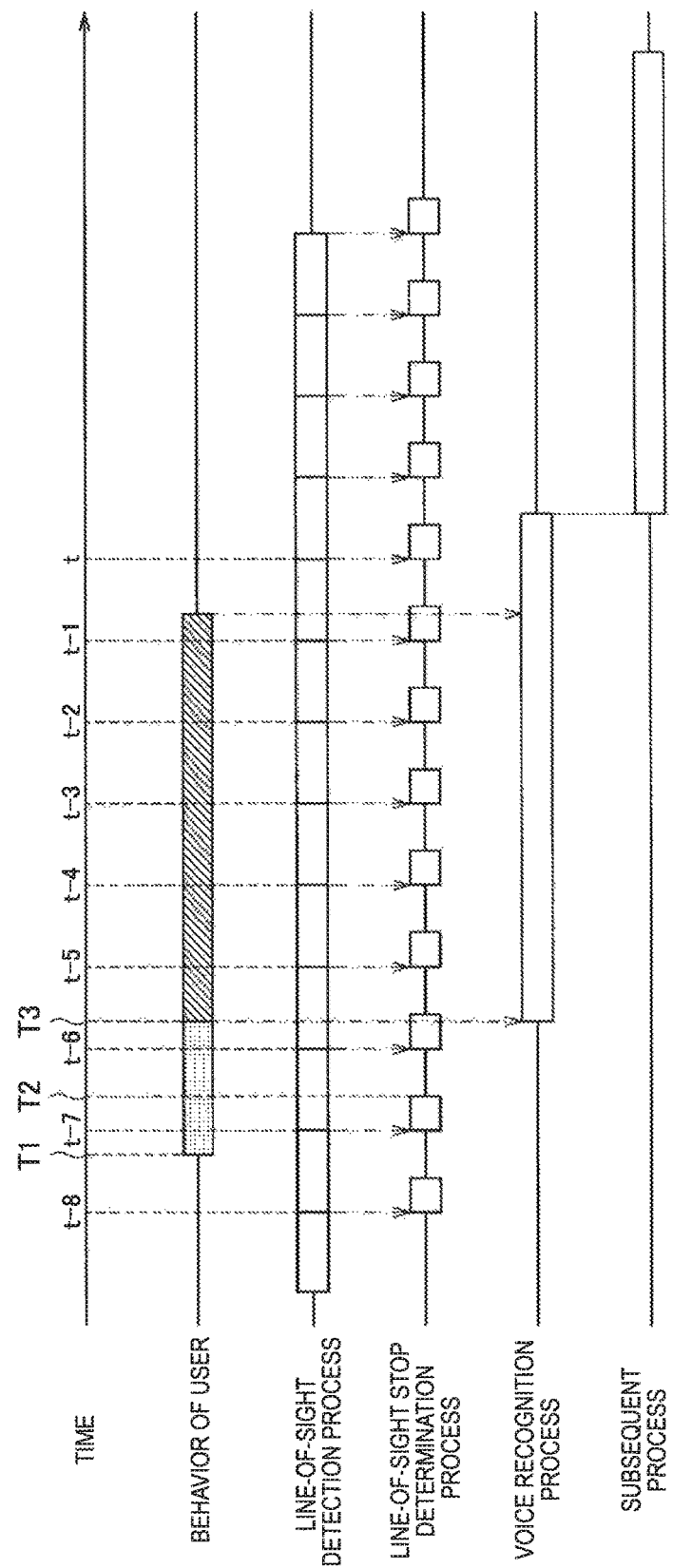

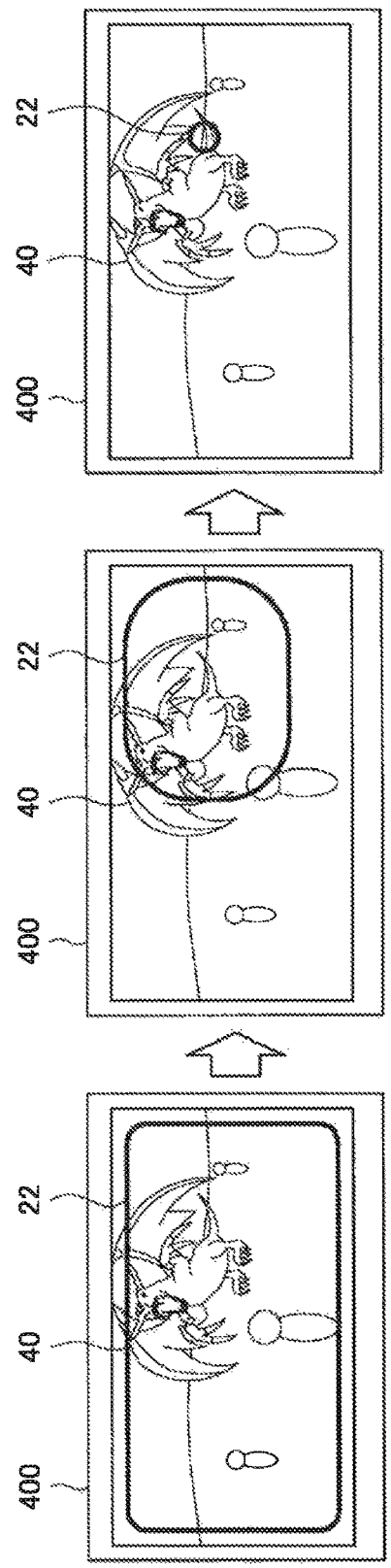

TIME

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2016/062403 (filed on Apr. 19, 2016) under 35 U.S.C. § 371, which claims priority to Japanese Patent Application No. 2015-129163 (filed on Jun. 26, 2015), which are all hereby incorporated by reference in their entirety.

TECHNICAL FIELD

The present disclosure relates to an information processing apparatus, an information processing method, and a program.

BACKGROUND ART

In recent years, with the development of information processing technology, various user interfaces for operating a device which performs information processing (hereinafter also referred to as a "user interface (UI)") have been developed. As such UIs, UIs based on a line of sight of the user, a gesture of the user, or the like are known.

For example, a system in which tracking of the line of sight of the user using a camera and recognition of the gesture of the user using a camera or sensor are performed, and display of an object being viewed by the user is updated on the basis of tracking and recognition results is disclosed in Patent Literature 1.

CITATION LIST

Patent Literature

Patent Literature 1: JP 2012-221498A

DISCLOSURE OF INVENTION

Technical Problem

However, in the system disclosed in Patent Literature 1, processing based on an operation of the user may be performed at a position different from an intention of the user. For example, the user generally shifts the line of sight to a position serving as a target of the user operation (hereinafter also referred to as an "operation target position") and then starts a gesture. However, in a case in which someone speaks to the user before recognition of the gesture is completed, the user may change the line of sight. In this case, the line of sight when the gesture is started may be different from the line of sight when the recognition of the gesture is completed. As a result, processing based on the gesture may be executed at a position different from an intention of the user.

In this regard, the present disclosure proposes an information processing apparatus, an information processing method, and a program, which are novel and improved and capable of suppressing an uncomfortable feeling of the user for a position at which processing related to the user operation is performed.

Solution to Problem

According to the present disclosure, there is provided an information processing apparatus, including: an input unit configured to obtain line-of-sight information related to a line of sight of a user and a detection result of a user operation; and a position deciding unit configured to decide an operation position at which a process related to the user operation is performed, on the basis of the line-of-sight information obtained at a second point of time specified on the basis of a first point of time prior to a detection start of the user operation.

In addition, according to the present disclosure, there is provided an information processing method, including: obtaining, by an input unit, line-of-sight information related to a line of sight of a user and a detection result of a user operation; and deciding an operation position at which a process related to the user operation is performed, on the basis of the line-of-sight information obtained at a second point of time specified on the basis of a first point of time prior to a detection start of the user operation.

In addition, according to the present disclosure, there is provided a program causing a computer to implement: an input function of obtaining line-of-sight information related to a line of sight of a user and a detection result of a user operation; and a position decision function of deciding an operation position at which a process related to the user operation is performed, on the basis of the line-of-sight information obtained at a second point of time specified on the basis of a first point of time prior to a detection start of the user operation.

Advantageous Effects of Invention

As described above, according to the present disclosure, an information processing apparatus, an information processing method, and a program, which are capable of suppressing an uncomfortable feeling of the user for a position at which processing related to the user operation is performed are provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 2 is a diagram illustrating an application example of the information processing system according to the embodiment.

FIG. 3 is a diagram for describing an example of a timing of a process related to decision of an operation position in an information processing apparatus according to the embodiment.

FIG. 4A is a diagram illustrating an example of a feedback object generated by the information processing apparatus according to the embodiment.

MODE(S) FOR CARRYING OUT THE INVENTION

Figure 1:
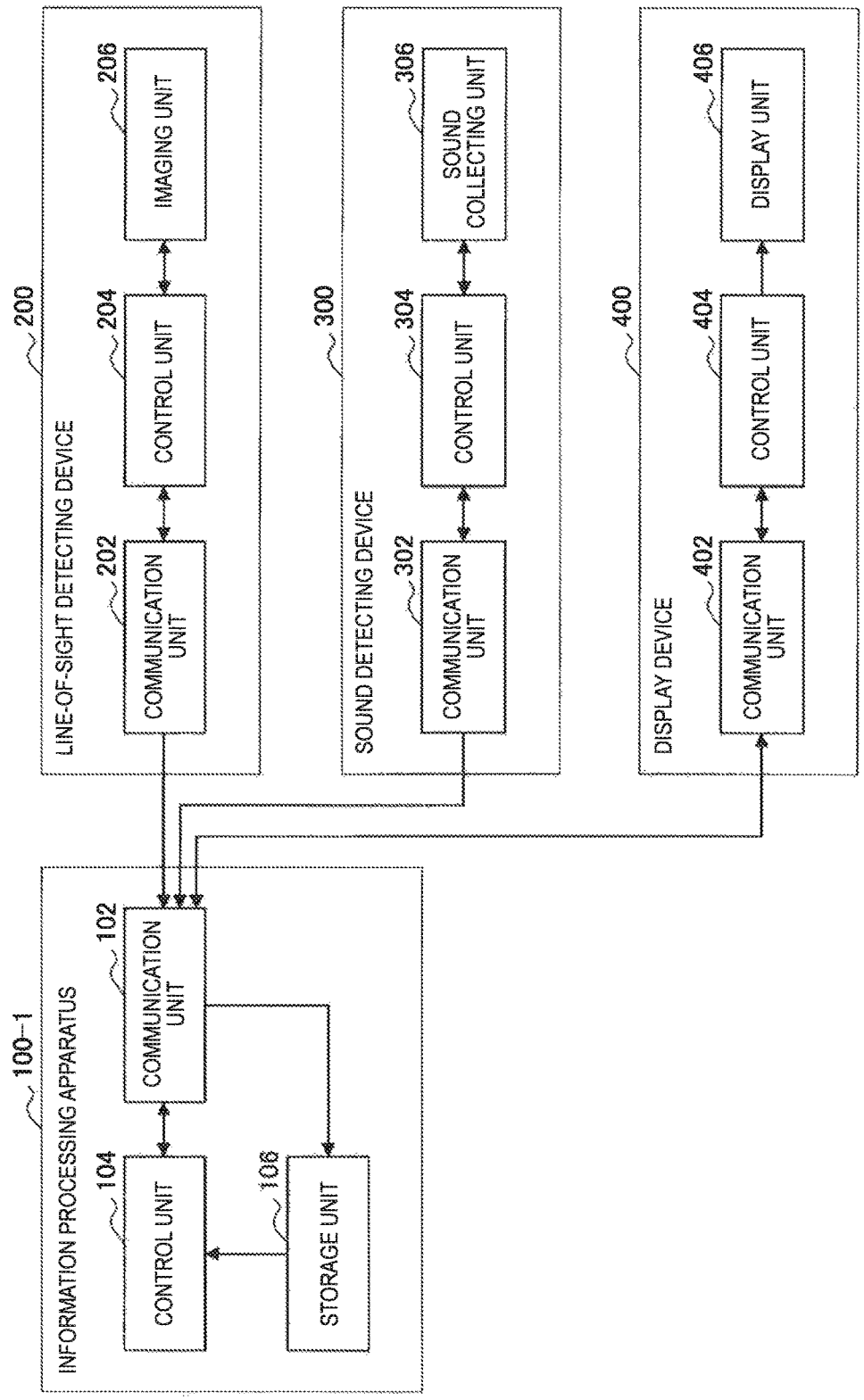
FIG. 1 is a block diagram illustrating an example of a schematic functional configuration of an information processing system according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will proceed in the following order.
1. Problems of related art
2. First embodiment of present disclosure (marking in image)
3. Second embodiment of present disclosure (marking in outside world image)
4. Hardware configuration of information processing apparatus according to one embodiment of present disclosure
5. Conclusion
<1. Problems of related art>

First, problems of an information processing apparatus according to a related art will be described.

An information processing apparatus according to the related art includes a line-of-sight information acquisition function, a gesture recognition function, and a display control function. The line-of-sight information acquisition function obtains information indicating the line of sight of the user (hereinafter also referred to as "line-of-sight information"). The gesture recognition function recognizes the gesture of the user. The display control function generates an image including a display object, and causes the image to be displayed on a display device or the like. For this reason, the information processing apparatus according to the related art is able to cause an image in which a predetermined display object is positioned in front of the line of sight of the user estimated on the basis of the line-of-sight information when a predetermined gesture is recognized to be displayed on the display device.

Here, in the information processing apparatus according to the related art, a time lag may occur between decision of an operation target position and detection of an operation. For example, the user generally shifts the line of sight to the operation target position and then starts a gesture. For this reason, there is some time between a point of time at which the line of sight is shifted to the operation target position and a point of time at which a gesture recognition process is completed, and a process based on the recognized gesture is performed.

On the other hand, the time lag in the information processing apparatus according to the related art is usually larger than time lags in the other information processing apparatuses according to the related art in which decision of an operation target position and detection of an operation are performed at substantially the same timing. For example, a touch panel is one of other information processing apparatuses according to the related art, and in the touch panel, when a screen is touched, decision of an operation target position and detection of a touch operation are performed substantially at the same time. Therefore, few time lag occurs.

As the time lag increases, a possibility of a change in the line of sight during the time lag increases. As a result, there is a high possibility that a process based on an operation is performed at a position different from an operation target position intended by the user. For example, the user changes the line of sight during a gesture recognition process, for example, when someone speaks to the user. In this case, the line of sight when the gesture is started may be different from the line of sight when the gesture recognition is completed. As a result, a process based on a gesture is executed at a position different from the intention of the user, thereby giving an uncomfortable feeling to the user.

In this regard, the present disclosure proposes an information processing apparatus 100 which is capable of suppressing the uncomfortable feeling of the user for the position at which a process related to the user operation is performed. Hereinafter, the information processing apparatus 100 will be described in detail. For the sake of convenience of description, information processing apparatuses 100 according to first and second embodiments are distinguished by assigning numbers corresponding to embodiments to the end as in as information processing apparatus 100-1 and information processing apparatus 100-2.
<2. First embodiment of present disclosure (marking in image)>

The problems of related art have been described above. Next, an information processing apparatus 100-1 according to a first embodiment of the present disclosure will be described. In the first embodiment, in a marking process for an image based on the line of sight and a voice of the user, marking is performed in front of the line of sight at a point of time at which the user recognizes the operation target position.
<2-1. Configuration of device>

First, a functional configuration of an information processing system including the information processing apparatus 100-1 according to the first embodiment of the present disclosure will be described with reference to FIG. 1. FIG. 1 is a block diagram illustrating an example of a schematic functional configuration of the information processing system according to the first embodiment of the present disclosure.

As illustrated in FIG. 1, the information processing system includes the information processing apparatus 100-1, a line-of-sight detecting device 200, a sound detecting device 300, and a display device 400. The devices of the information processing system are connected with one another via communication. Further, the line-of-sight detecting device 200, the sound detecting device 300, and the display device 400 are arranged around the user.

((Functional configuration of information processing apparatus))

As illustrated in FIG. 1, the information processing apparatus 100-1 includes a communication unit 102, a control unit 104, and a storage unit 106.

The communication unit 102 performs communication with the line-of-sight detecting device 200, the sound detecting device 300, and the display device 400. Specifically, the communication unit 102 receives the line-of-sight information from the line-of-sight detecting device 200 as an input unit, and receives information related to a sound made by the user (hereinafter also referred to as "sound. information") from the sound detecting device 300. Further, the communication unit 102 transmits image information to the display device 400. For example, the communication performed by the communication unit 102 may be wired communication or wireless communication.

The storage unit 106 stores information related to a control process of the control unit 104. Specifically, the storage unit 106 stores the received line-of-sight information, an image to be displayed on the display device 400, a display object and marker information to be described later, and the like.

The control unit 104 decides a position at which a process related to a user operation is performed (hereinafter also referred to as "operation position"), and performs a process at the operation position. Specifically, the control unit 104 includes an operation position decision function, an operation position prior notification function, and an operation position marking function. The functions will be described in detail below.

(Operation position decision function)

The control unit 104 decides the operation position on the basis of the line-of-sight information and a user operation detection result as a position deciding unit. Specifically, in a case in which the user operation detection result indicates a predetermined user operation, the control unit 104 decides the operation position on the basis of the line-of-sight information obtained at a second point of time (hereinafter also referred to as a "processing target point of time") specified on the basis of a first point of time (hereinafter also referred to as a "reference point of time") prior to the detection start of the user operation. Further, a process of the control unit 104 will be described in detail with reference to FIG. 2. FIG. 2 is a diagram illustrating an application example of the information processing system according to the present embodiment.

First, the control unit 104 obtains the line-of-sight information of the user. For example, the control unit 104 obtains line-of-sight information indicating a line of sight of a user U1 from the line-of-sight detecting device 200 via the communication unit 102 as illustrated in a left diagram of FIG. 2. The control unit 104 may request the line-of-sight detecting device 200 to transmit the line-of-sight information via the communication unit 102, or the line-of-sight information may be spontaneously transmitted from the line-of-sight detecting device 200. Further, the sound information is processed, similarly to the line-of-sight information. Further, the obtained line-of-sight information is sequentially stored in the storage unit 106.

Then, if the line-of-sight information is obtained, the control unit 104 causes a display object (hereinafter also referred to as a "line-of-sight object") indicating a position in front of the line of sight specified by the line-of-sight information (also referred to as a "line-of-sight position") to be displayed on the display device 400. For example, the control unit 104 specifies the line-of-sight position on the basis of the acquired line-of-sight information, and generates an image in which a line-of-sight object 10 illustrated in the left diagram of FIG. 2 is displayed superimposed on the specified line-of-sight position. Then, the control unit 104 causes the generated image to be displayed on the display device 400 via the communication unit 102.

Further, if the line-of-sight information is obtained, the control unit 104 determines whether or not the user recognizes the operation target position on the basis of the line-of-sight information. For example, the control unit 104 performs determination of whether or not the line of sight of the user is stopped (hereinafter also referred to as "determination of whether or not the line of sight is stopped") on the basis of a plurality of pieces of line-of-sight information. If the line of sight of the user is determined to be stopped, a determination point of time is stored in the storage unit 106 as the reference point of time.

Then, the control unit 104 obtains a user operation detection result as an input unit. For example, if the sound information is received by the communication unit 102, the control unit 104 determines the presence or absence of an operation using the sound made by the user on the basis of the sound information. For example, the control unit 104 determines whether or not a keyword "koko (here)" illustrated in a right diagram of FIG. 2 is included in the voice of the user.

Then, in a case in which the user operation detection result indicates a predetermined user operation, the control unit 104 performs an operation position decision process on the basis of a point of time related to the recognition of the user for the operation target position (hereinafter also referred to as a "user recognition point of time"). For example, in a case in which the keyword is determined to he included in the sound information, the control unit 104 decides a position corresponding to the line-of-sight position at the point of time at which the line of sight of the user is determined to be stopped, that is, a position at which the line-of-sight object 10 as illustrated in the left diagram of FIG. 2 is superimposedly displayed as an operation position serving as a target of the operation of the user. Further, information related to the user operation such as the sound information function as a trigger of the operation position decision process and thus is hereinafter also referred to as "trigger information."

The operation position decision process will be described in detail with reference to FIG. 3. FIG. 3 is a diagram for describing an example of a timing of a process related to the operation position determination in the information processing apparatus 100-1 according to the present embodiment.

In general, a behavior of the user of performing an operation is performed in the order of recognition of the operation target position and execution of the operation. For example, as illustrated in FIG. 3, the operation target position is recognized at a time T1, and the operation is started at a time T3. The operation position decision process focused on the recognition point of time of the operation target position will be described below.

First, the control unit 104 obtains the line-of-sight information at predetermined time intervals. For example, the line-of-sight detection process is performed by the line-of-sight detecting device 200 at predetermined time intervals as illustrated in FIG. 3. Then, the communication unit 102 receives the line-of-sight information generated by the line-of-sight detection process from the line-of-sight detecting device 200, and provides the received line-of-sight information to the control unit 104.

Then, if the line-of-sight information is obtained, the control unit 104 performs the line-of-sight stop determination. Specifically, the control unit 104 performs the line-of-sight stop determination on the basis of a plurality of pieces of line-of-sight information. For example, the control unit 104 determines whether or not each of the line-of-sight positions related to a plurality of pieces of line-of-sight information obtained within a predetermined period of range falls within a predetermined distance range. In case in which each of the line-of-sight positions is determined to fall within the predetermined distance range, the line of sight of the user is determined to be stopped. For example, in a case in which the line of sight of the user is determined to be stopped in the line-of-sight stop determination process starting from t-7, the control unit 104 stores the time T2 which is the determination point of time in the storage unit 106.

The line-of-sight stop determination process may be performed each time the line-of-sight information is obtained as illustrated in FIG. 3 or may be performed on some of the obtained line-of-sight information. The line-of-sight stop determination process may be performed by another device such as the line-of-sight detecting device 200, and the control unit 104 may obtain a line-of-sight stop determination result via the communication unit 102.

Then, if the trigger information is obtained, the control unit 104 detects the user operation. For example, if the user starts to speak at a time T3 illustrated in FIG. 3, the sound detecting device 300 starts to generate the sound information. Then, if the generated sound information is received from the sound detecting device 300, the control unit 104 starts a voice recognition process on the basis of the received sound information. Then, if the speaking of the user ends, and the reception of the sound information is completed, the voice recognition process ends. Thereafter, the control unit 104 determines whether or not a predetermined sound pattern is included in a sound indicated by the sound information is included, that is, whether or a predetermined keyword is included in a voice recognition result obtained by the voice recognition process.

After the speaking of the user ends, the sound information from the start of the speaking of the user to the end of the speaking of the user may be generated, and the voice recognition process may be performed on the basis of the generated sound information. Further, the detection of the user operation based on the sound information may be performed by another device such as the sound detecting device 300, and the control unit 104 may obtain a user operation detection result based on the sound information via the communication unit 102. Further, the keyword is not limited to the example of FIG. 2, and various keywords may be employed. Further, the keyword may be decided in advance or may be added or changed in accordance with a setting change.

If the detection of the user operation is completed, the control unit 104 specifies the processing target point of time on the basis of the point of time at which the line of sight of the user is determined to be stopped. Specifically, the control unit 104 specifies a point of time closer to the point of time at which the line of sight is determined to be stopped than other points of time among points of time at which the line-of-sight information is obtained. For example, in a case in which the keyword is determined to be included in the voice recognition result, the control unit 104 selects t-7 which is closer to the time T2 out of the line-of-sight detection timings t-7 and t-6 temporally close to the time T2 stored in the storage unit 106. The line-of-sight detection timing may be a timing at which an image for line-of-sight detection is captured.

Any one timing may be decided as the selected line-of-sight detection timing in advance. For example, in a case in which the predetermined time interval at which the line-of-sight detection process is performed is an interval in which influence on the operation position by shifting of the line of sight at the time interval is allowed, any one of line-of-sight detection timings temporally close to the point of time at which the line of sight is determined to be stopped is fixedly selected.

Further, the control unit 104 may select the line-of-sight detection timing from the line-of-sight detection timings prior to the point of time at which the line of sight of the user is determined to be stopped. For example, the control unit 104 selects one of the line-of-sight detection timings t-8 and t-7 prior to the time T2 stored in the storage unit 106.

Then, the control unit 104 decides the operation position using the line-of-sight information obtained at the specified point of time. For example, the control unit 104 acquires the line-of-sight information obtained in the line-of-sight detection process at the selected t-7 from the storage unit 106. Then, the control unit 104 decides the operation position as a position corresponding to the line-of-sight position specified from the acquired line-of-sight information. The decided operation position may be a position obtained as the line-of-sight position specified from the line-of-sight information is corrected.

Further, in a case in which a candidate position for displaying a feedback object to be described later is decided, the operation position may be decided on the basis of the candidate position. For example, the position corresponding to the candidate position is decided as the operation position. (Operation position prior notification function)

Before the operation position is decided, the control unit 104 notifies the user of a position which is a candidate for the operation position (hereinafter also referred to as a "candidate position"). Specifically, the control unit 104 performs display control for a display object serving as a second display object in which the operation position is specified (hereinafter also referred to as a "feedback object") as a display control unit. For example, the feedback object is superimposedly displayed on the basis of the candidate position until the operation position is decided after the reference point of time. Further, the display control process of the feedback object will be described in detail with reference to FIG. 2.

First, the control unit 104 decides the candidate position on the basis of the line-of-sight stop determination result. For example, if the line of sight of the user is determined to be stopped, the control unit 104 performs substantially the same process as the operation position decision process and decides the candidate position.

Then, the control unit 104 causes the feedback object to be displayed superimposed on the candidate position. For example, if the candidate position is decided, the control unit 104 acquires a feedback object 20 from the storage unit 106. Then, as illustrated in a middle diagram of FIG. 2, the control unit 104 causes the acquired feedback object 20 to be displayed superimposed on the candidate position on the image.

Then, if the operation position is decided, the control unit 104 deletes the feedback object. For example, if the operation position is decided, the control unit 104 deletes the feedback object 20 from the screen as illustrated in the left diagram of FIG. 2.

Figure 4B:
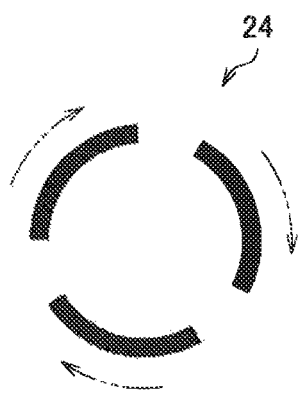
FIG. 4B is a diagram illustrating an example of a feedback object generated by the information processing apparatus according to the embodiment.
Figure 4C:
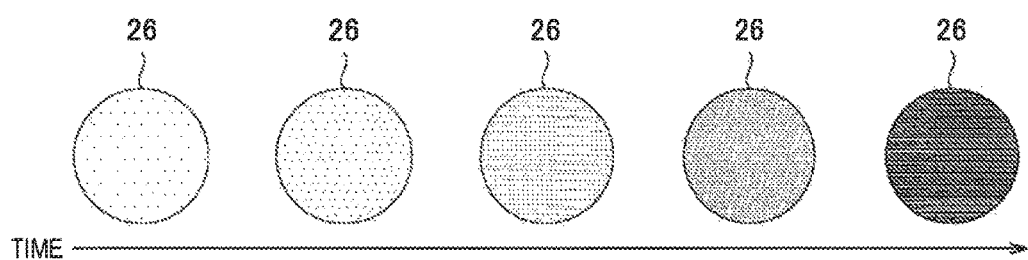
FIG. 4C is a diagram illustrating an example of a feedback object generated by the information processing apparatus according to the embodiment.

In FIG. 2, an example in which the feedback object is circular has been described, but the feedback object may have various other forms. For example, the feedback object may have a polygonal shape or an elliptical shape and may be a symbol or an icon. Further, the feedback object may be a display object such as an arrow or flag indicating the candidate position. Further, examples of the feedback object will be described with reference to FIGS. 4A to 4C. FIGS. 4A to 4C are diagrams illustrating examples of the feedback object generated by the information processing apparatus 100-1 according to the present embodiment.

The feedback object may visually change with the passage of time. Specifically, the feedback object is superimposedly displayed to change towards the candidate position. For example, as illustrated in FIG. 4A, a feedback object 22 is initially a display object such as a rectangle-like frame line along a screen and then reduced while changing a shape toward the candidate position with the passage of time. The shape of the feedback object 22 may not change, and only a scale may change. Further, the change of the feedback object 22 may be repeated twice or more until the operation position is decided. For example, the flow from the left diagram to the right diagram of FIG. 2A may be repeated twice or more.

Further, the feedback object may be changed to rotate. For example, as illustrated in FIG. 4B, a feedback object 24 is an annular dashed display object which is superimposedly displayed to rotate on the center of the circle.

Further, a visual attribute of the feedback object may be changed. For example, as illustrated in FIG. 4C, luminance of a feedback object 26 is changed with the passage of time. As the visual attribute, a hue, brightness, saturation, luminance, a contrasting density, or a pattern may be used.

Further, the feedback object may bed change so that a time passed from a display start is recognized by the user. For example, as illustrated in FIG. 4C, a feedback object 26 is superimposedly displayed such that the luminance of the feedback object 26 is increased as the time passes from the display start of the feedback object 26.

The change in the feedback object may be a temporal change such as blinking.

(Operation position marking function)

Then, the control unit 104 performs a user notification process on the decided operation position. Specifically, the control unit 104 performs display control of a display object for the decided operation position (hereinafter also referred to as a "marker object") as a display control unit. For example, if the operation position is decided, the control unit 104 causes a marker object 30 illustrated in the right diagram of FIG. 2 to be superimposed on the position corresponding to the operation position in the image. Then, the control unit 104 causes the display device 400 to display an image on which a marker object 30 is superimposed via the communication unit 102. In a case in which the line-of-sight position of the user is changed, the control unit 104 moves the line-of-sight object 10 to the changed line-of-sight position but does not move the marker object 30.

Figure 5A:
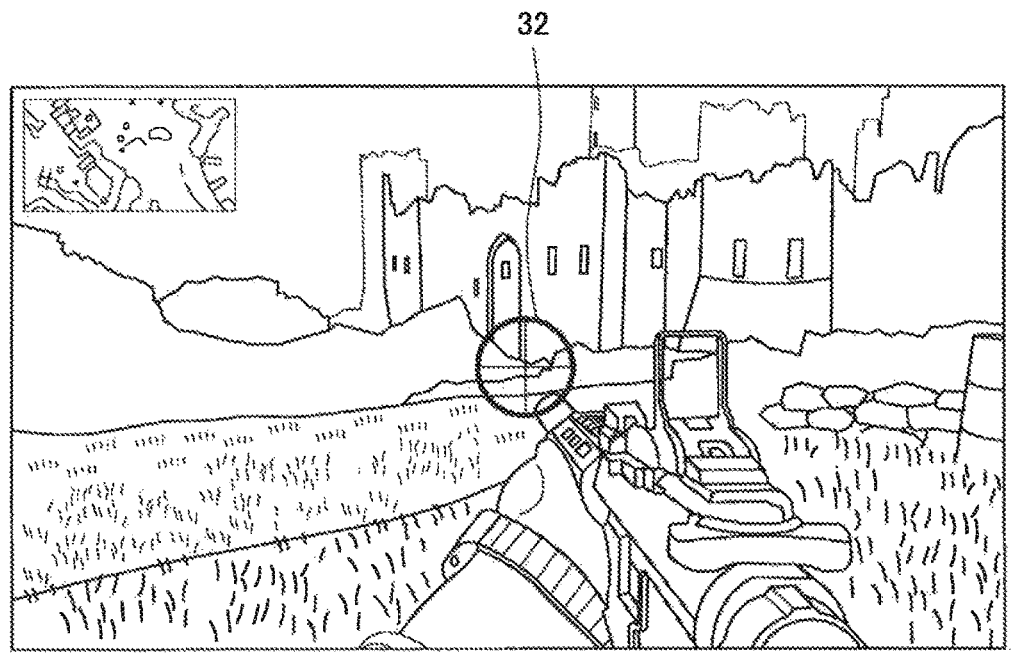
FIG. 5A is a diagram illustrating an example of a marker object generated by the information processing apparatus according to the embodiment.
Figure 5B:
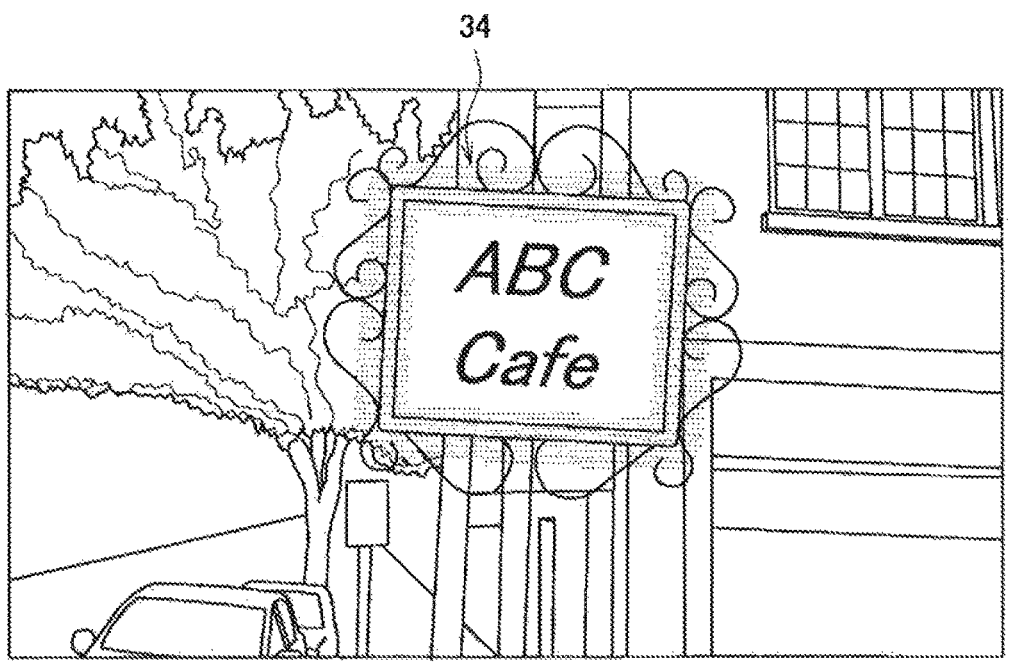
FIG. 5B is a diagram illustrating an example of a marker object generated by the information processing apparatus according to the embodiment.
Figure 5C:
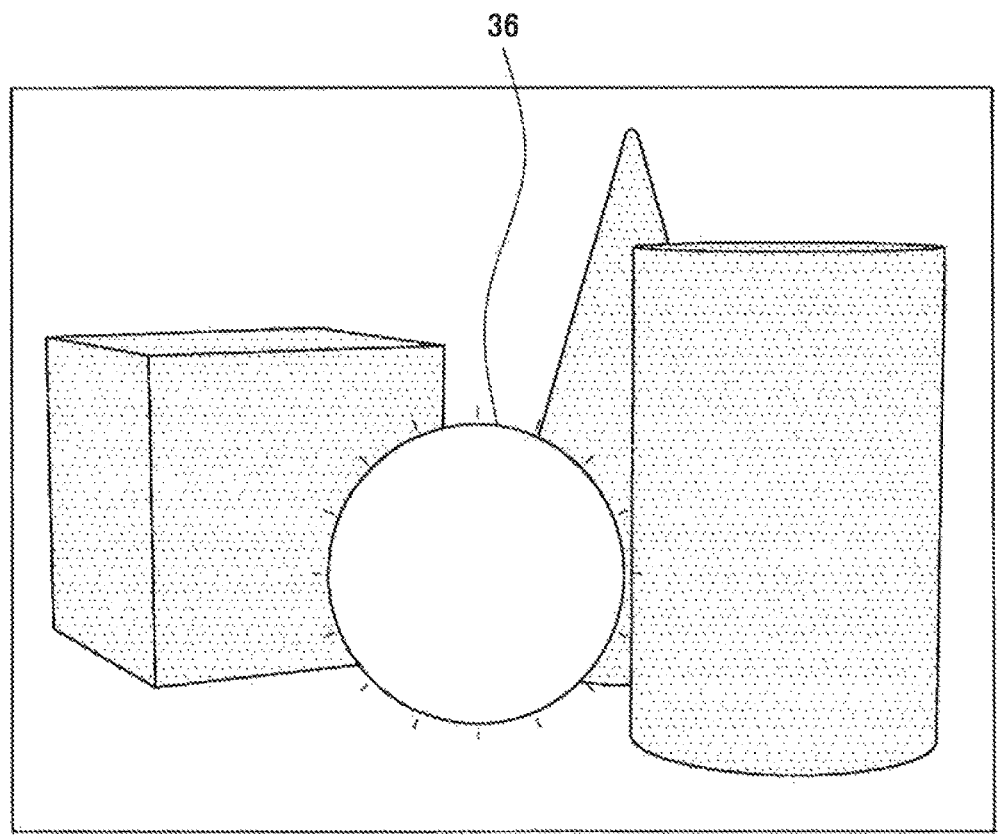
FIG. 5C is a diagram illustrating an example of a marker object generated by the information processing apparatus according to the embodiment.

In FIG. 2, an example in which the marker object is circular has been described, but the marker object may have various other forms. For example, the marker object may be a polygonal shape or an elliptical shape and may be a symbol or an icon. The marker object may also be a display object such as an arrow or a flag indicating the operation position or may be a display object which is highlighted such as blinking or a temporal change in a color, saturation, luminance, or brightness. Further, examples of the marker object will be described with reference to FIGS. 5A to 5C, FIGS. 5A to 5C are diagrams illustrating examples of the marker object generated by the information processing apparatus 100-1 according to the present embodiment.

The marker object may be a display object such as a target in a case in which the user operation is an operation aiming at the operation position. For example, a marker object 32 may be a display object indicating an aiming position as illustrated in FIG. 5A.

Further, the marker object may be a display object which highlights a contour of an object at the operation position. For example, a marker object 34 may be a display object of a rectangular frame which is a contour of a rectangular signboard illustrated in FIG. 5B.

Further, the display of the marker object may be a display change of an object at the operation position. For example, in a case in which there is a spherical display object 36 illustrated in FIG. 5C at the operation position, a display object 36 is caused to emit light.

((Functional configuration of line-of-sight detecting device))

Subsequently, as illustrated in FIG. 1, the line-of-sight detecting device 200 includes a communication unit 202, a control unit 204, and an imaging unit 206 as a line-of-sight information acquiring device.

The communication unit 202 performs communication with the information processing apparatus 100-1. Specifically, the communication unit 202 transmits the line-of-sight information provided from the control unit 204 to the information processing apparatus 100-1.

The control unit 204 controls the operation of the line-of-sight detecting device 200 in general. Specifically, the control unit 204 instructs the imaging unit 206 to perform imaging at predetermined time intervals and generates the line-of-sight information on the basis of an image obtained by the imaging performed by the imaging unit 206. Then, the control unit 204 causes the communication unit 202 to transmit the generated line-of-sight information to the information processing apparatus 100-1. For example, the control unit 204 analyzes the user included in the image provided from the imaging unit 206 and detects the line of sight of the user. Then, the control unit 204 generates the line-of-sight information indicating the detected line of sight. For the detection of the line of sight of the user, for example, a general technique such as a line-of-sight detection technique based on a position of an iris or a pupil, a motion of a head of a human body, or the like is used.

The imaging unit 206 images the user on the basis of an instruction given from the control unit 204. Specifically, the imaging unit 206 performs imaging in the vicinity of the user so that the user becomes a subject, and provides an image obtained by the imaging to the control unit 204. For example, the imaging unit 206 may include an imaging optical system such as a taking lens and a zoom lens for collecting light and a signal conversion element such as a Charge Coupled Device (CCD) or a complementary metal oxide semiconductor (CMOS). Further, the imaging unit 206 may be an infrared (IR) camera or may be a combination of a visible light camera and an IR camera.

((Functional configuration of sound detecting device))

Subsequently, as illustrated in FIG. 1, the sound detecting device 300 includes a communication unit 302, a control unit 304, and a sound collecting unit 306 as a sound information acquiring device.

The communication unit 302 performs communication with the information processing apparatus 100-1. Specifically, the communication unit 302 transmits the sound information provided from the control unit 304 to the information processing apparatus 100-1.

The control unit 304 controls the operation of the sound detecting device 300 in general. Specifically, the control unit 304 instructs the sound collecting unit 306 to start or stop sound collection, and causes the communication unit 302 to transmit the sound information obtained by the sound collection performed by the sound collecting unit 306 to the information processing apparatus 100-1. For example, the control unit 304 may remove noise included in the sound information.

The sound collecting unit 306 detects sounds around the sound detecting device 300. Specifically; the sound collecting unit 306 collects sounds around the sound detecting device 300, that is, around the user on the basis of an instruction given from the control unit 304. Then, the sound collecting unit 306 generates the sound information indicating the collected sound, and provides the generated sound information to the control unit 304. For example, the sound collecting unit 306 may be a sound collector such as a microphone or a microphone array. The sound collecting unit 306 may provide a signal related to the collected sound to the control unit 304, and the control unit 304 may generate the sound information.

((Functional configuration of display device))

Subsequently; the display device 400 has a communication unit 402, a control unit 404, and a display unit 406 as an output device as illustrated in FIG. 1, The communication unit 402 performs communication with the information processing apparatus 100-1. Specifically, the communication unit 402 receives the image information from the information processing apparatus 100-1 and provides the received image information to the control unit 404.

The control unit 404 controls the operation of the display device 400 in general. Specifically, if the image information is received by the communication unit 402, the control unit 404 provides the received image information to the display unit 406 and gives an instruction to display the image.

The display unit 406 displays the image on the basis of the image information provided from the control unit 404. For example, the display unit 406 may be a liquid crystal panel or organic electro luminescence (EL) or the like.

<2-2. Process of device>

Figure 6:
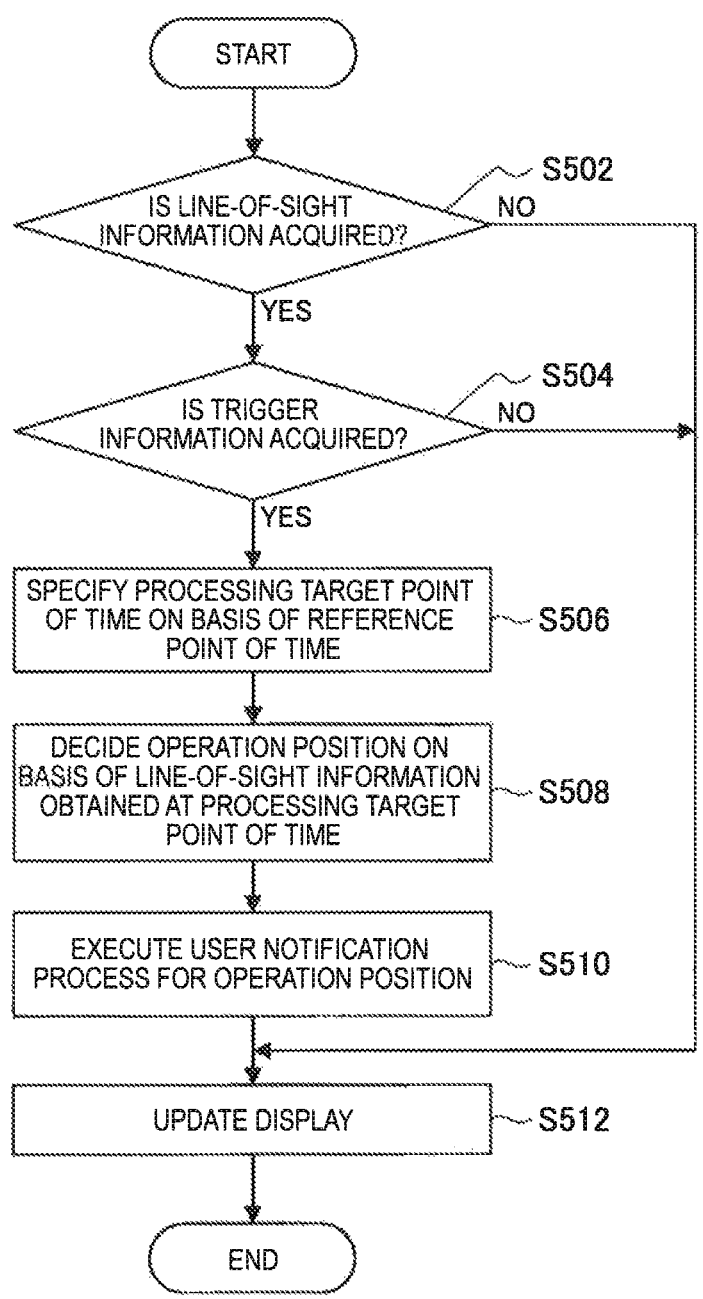
FIG. 6 is a flowchart conceptually illustrating a process of the information processing apparatus according to the embodiment.

Next, a processing of the information processing apparatus 100-1 according to the present embodiment will be described with reference to FIG. 6. FIG. 6 is a flowchart conceptually illustrating a process of the information processing apparatus 100-1 according to the present embodiment.

First, the information processing apparatus 100-1 acquires the line-of-sight information (step S502). Specifically, the communication unit 102 receives the line-of-sight information from the line-of-sight detecting device 200. Then, the control unit 104 performs the line-of-sight stop determination on the basis of the received line-of-sight information. Further, in a case in which the line-of-sight information is not received within a predetermined period of time, for example, until a next frame is displayed, the control unit 104 causes the process to proceed to step S512.

Then, the information processing apparatus 100-1 is on standby until the trigger information is acquired (step S504). Specifically, if the sound information serving as the trigger information is received from the sound detecting device 300 by the communication unit 102, the control unit 104 performs the user operation detection on the basis of the received sound information. Further, in a case in which the sound information is not received within the predetermined period of time after the line-of-sight information is received, the control unit 104 causes the process to proceed to step S512.

If the trigger information is acquired, the information processing apparatus 100-1 specifies the processing target point of time on the basis of the reference point of time (step S506). Specifically, the control unit 104 decides the line-of-sight detection timing on the basis of the point of time at which the line of sight is determined to be stopped.

Then, the information processing apparatus 100-1 decides the operation position on the basis of the line-of-sight information obtained at processing target point of time (step S508). Specifically; the control unit 104 acquires the line-of-sight information obtained at the decided line-of-sight detection timing and decides a position corresponding to the line-of-sight position specified from the acquired line-of-sight information as the operation position.

Then, the information processing apparatus 100-1 executes the user notification process for the operation position (step S510). Specifically, the control unit 104 generates an image of a next frame, and causes the marker object to be superimposed on the generated image at the decided operation position.

Then, the information processing apparatus 100-1 causes the display device 400 to update the display (step S512). Specifically, the control unit 104 causes the communication unit 102 to transmit the image information related to the generated image to the display device 400. Then, the display device 400 updates the display of the image on the basis of the received image information.

Further, in a case in which the process proceeds from step S502 or S504 to step S512, the image of the next frame is generated in step S512. At this time, the display of the line-of-sight object may also he updated. Further, if the line of sight is determined to be stopped in step S502, and the operation position is not decided, the image information related to the image on which the feedback object is superimposedly displayed is transmitted to the display device 400. In a case in which the feedback object is already superimposedly being displayed, the display of the feedback object may be updated.

<2-3. Conclusion of first embodiment>

As described above, according to the first embodiment of the present disclosure, the information processing apparatus 100-1 obtains the line-of-sight information related to the line of sight of the user and the user operation detection result. Then, the information processing apparatus 100-1 decides the operation position on which the process related to the user operation is performed on the basis of the line-of-sight information obtained at the second point of time specified on the basis of the first point of time prior to the detection start of the user operation detection. Therefore, even in a case in which a time lag occurs before the user operation detection is completed after the point of time at which the user recognizes the operation target position, deviation between the operation position affected by the time lag and the operation target position intended by the user is suppressed. As a result, it is possible to suppress the uncomfortable feeling of the user for the position at which the process related to the user operation is performed.

Further, the information processing apparatus 100-1 performs display control of the display object for the decided operation position. Therefore, since the operation position is visually presented to the user, it is possible to make it easy for the user to recognize the operation position.

Further, the first point of time includes the point of time related to the recognition of the user for the operation target position serving as the target of the user operation. Therefore, since the operation position is brought closer to the recognition operation target position of the user, it is possible to improve the effect of suppressing the uncomfortable feeling of the user.

Further, the point of time related to the recognition of the user is estimated on the basis of the result of determining whether or not the line of sight of the user is stopped. In general, the user first visually specifies the operation target position. Therefore, according to this configuration, since the recognition of the operation target position is detected on the basis of the line of sight of the user, it is possible to detect the user recognition point of time more accurately. As a result, it is possible to further suppress the uncomfortable feeling of the user.

Further, the second point of time includes a point of time that is closer to the first point of time than other points of time among the points of time at which the line-of-sight information is obtained. Therefore, since the point of time at which the line-of-sight information used in the operation position decision process is acquired is brought closer to the point of time of the recognition of the user, it is possible to decide the operation position at which it is difficult to give the uncomfortable feeling to the user.

Further, the information processing apparatus 100-1 performs the display control of the second display object in which the candidate position to be the operation position is specified, and the second display object is displayed on the basis of the candidate position until the operation position is decided after the first point of time. Therefore, since the candidate position is presented to the user in advance, the user is able to select whether or not it is the operation position and improve the convenience of the user.

Further, the above second display object is visually changed with the passage of time. Therefore, since the feedback object is highlighted, it is possible to reduce the possibility that the user overlooks the feedback object, that is, the candidate position.

Further, the second display object is displayed to change towards the candidate position. Therefore, since the feedback object is superimposedly displayed using a region of an image other than the candidate position, the display of the feedback object is further emphasized, and thus it is possible to further reduce the possibility that the user overlooks the feedback object, that is, the candidate position.

Further, the user operation includes operation using the sound made by the user. Therefore, even when another operation, for example, a gesture operation or a device operation is unable to be performed because the user is working, it is possible to operate the information processing apparatus 100-1 or operate a device by operating the information processing apparatus 100-1.

<2-4. Modified examples>

The first embodiment of the present disclosure has been described above.

The present embodiment is not limited to the above example. First to sixth modified examples of the present embodiment will be described below.

(First Modified Example)

As a first modified example of the present embodiment, the point of time related to the recognition of the user, that is, the reference point of time may be estimated on the basis of a human reaction time to the user operation (hereinafter also referred to as an "operation reaction time"). Specifically, the control unit 104 decides a point of time obtained by going back from a detection start point of time of the user operation by the human reaction time to the user operation as the reference point of time.

Here, in humans, there is a reaction time which is a time passed until a behavioral reaction occurs after a sensory stimulus is presented. For example, a time lag occurs until an operation is actually performed after the operation target is visually recognized. Since the reaction time can be specified by an experiment, an investigation, or the like, a fixed value or a value obtained by machine learning is usable. In this regard, in the present modified example, the reaction time previously stored in the storage unit 106 or the like is used. Further, a process of the present modified example will be described in detail with reference to FIG. 2.

If the trigger information is received, the control unit 104 records the reception point of time of the trigger information. For example, as illustrated in the middle diagram of FIG. 2, if the user U1 starts to speak, the sound information related to the speaking is received. If the sound information is received, the control unit 104 stores the reception point of time of the sound information in the storage unit 106.

Then, the control unit 104 detects the user operation on the basis of the received trigger information. For example, the control unit 104 performs the voice recognition process on the basis of the received sound information, and determines whether or not the keyword is included in a processing result of the voice recognition process.

Then, in a case in which the user operation detection result indicates a predetermined user operation, the control unit 104 decides the reference point of time on the basis of the operation reaction time. For example, in a case in which the keyword is determined to be included the processing result, the control unit 104 decides the point of time obtained by going back from the reception point of time of the sound information stored in the storage unit 106 by the operation reaction time as the reference point of time.

Then, the control unit 104 performs the operation position decision process on the basis of the decided reference point of time. For example, in a case in which the keyword is determined to be included in the sound information, the control unit 104 decides a position at which the user is estimated to recognize as the operation target from the operation reaction time, that is, a position at which the line-of-sight object 10 illustrated in the left diagram of FIG. 2 is superimposedly displayed as the operation position.

The operation reaction time may be decided in accordance with an attribute of the user performing the operation. For example, the attribute of the user may be an age, a sex, a race, or a health state of the user. Further, the operation reaction time may be decided in accordance with the type of user operation. For example, the type of user operation may be a gesture operation or a device operation to be described later in addition to an operation using the sound.

Further, the reference point of time may be selected from among the line-of-sight stop determination point of time and the points of time specified from the operation reaction time. For example, in a case in which the line of sight is determined to be stopped within a predetermined period of time before the user operation is detected, the line-of-sight stop determination point of time may be selected as in the first embodiment, or the point of time specified from the operation reaction time may be selected in a case in which the user operation is detected in a state in which the line of sight is determined not to be stopped.

As described above, according to the first modified example of the present embodiment, the point of time related to the recognition of the user is estimated on the basis of the human reaction time to the user operation. Therefore, since the reference point of time is decided without detecting the recognition of the user, it is possible to reduce a processing amount as compared with the case in which the process of detecting the recognition of the user is performed.

(Second Modified Example)

Figure 7:
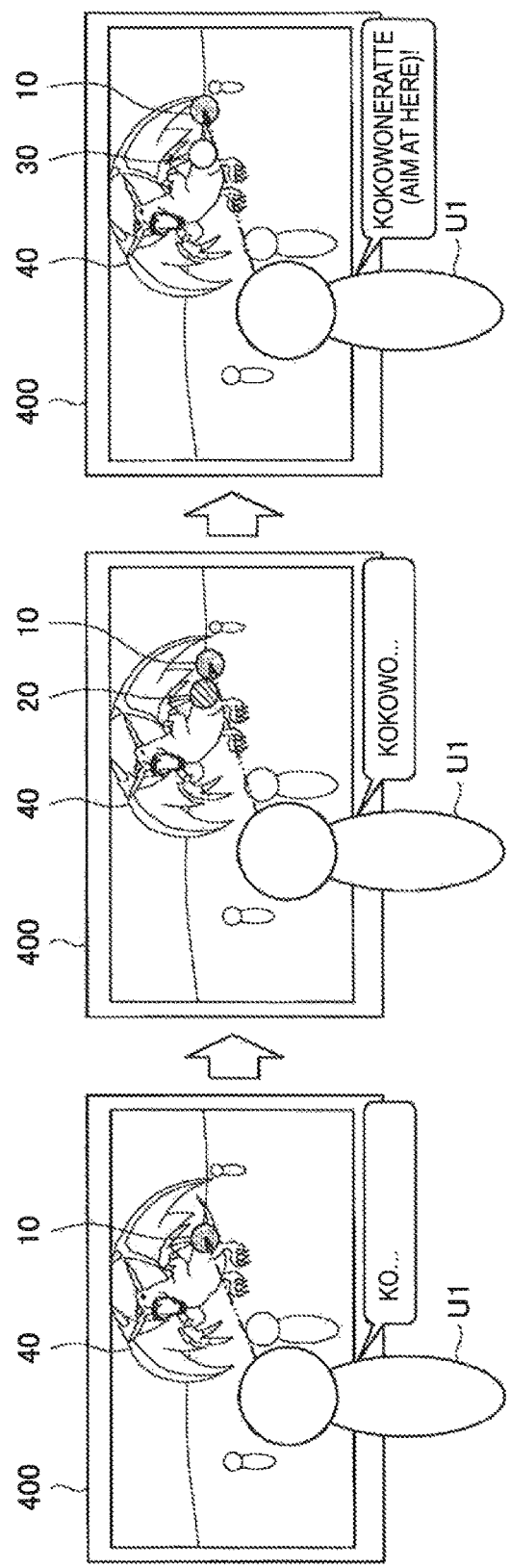
FIG. 7 is a diagram illustrating an application example of an information processing system according to a second modified example of the embodiment.

As a second modified example of the present embodiment, the reference point of time may be the detection start point of time of the user operation. Specifically, the control unit 104 specifies the processing target point of time on the basis of the point of time at which the detection of the user operation on the basis of a point of time at which the detection of the user operation based on the received trigger information is started, and decides the operation position on the basis of the line-of-sight information obtained at the specified processing target point of time. Further, a process of the present modified example will be described with reference to FIG. 7. FIG. 7 is a diagram illustrating an application example of an information processing system according to the second modified example of the present embodiment.

First, if the trigger information is obtained, the control unit 104 starts the detection of the user operation on the basis of the trigger information. For example, if the user UI starts to speak as illustrated in the left diagram of FIG. 7, the control unit 104 starts to receive the sound information by the communication unit 102. If the sound information is received, the control unit 104 starts to determine the presence or absence of an operation using a sound on the basis of the sound information. Further, a start point of time of the determination is stored in the storage unit 106 as the reference point of time.

Further, the control unit 104 starts the display of the feedback object at the candidate position decided on the basis of the detection start point of time of the user operation. For example, the control unit 104 performs the process of deciding the candidate position using the detection start point of time of the user operation as the reference point of time, and causes the feedback object 20 as illustrated in the middle diagram of FIG. 7 to be displayed superimposed on the decided candidate position.

Then, in a case in which the user operation detection result indicates a predetermined user operation, the control unit 104 performs the operation position decision process on the basis of the detection start point of time of the user operation. For example, in a case in which the keyword is determined to be included in the sound information, the control unit 104 decides the candidate position, that is, the position corresponding to the position at which the feedback object 20 illustrated in the middle diagram of FIG. 7 is superimposedly displayed as the operation position.

Further, the process of the present modified example will be described in detail with reference to FIG. 3. Further, description of processes that are substantially the same as those described above is omitted.

As described above, in general, a behavior of the user of performing an operation is performed in the order of recognition of the operation target position and execution of the operation. Here, the operation position decision process focused on the operation detection start point of time will be described.

First, if the trigger information is obtained, the control unit 104 starts the detection of the user operation. For example, if the user starts to speak at a time T3 illustrated in FIG. 3, the sound information generated by the sound detecting device 300 is received from the sound detecting device 300. Then, the control unit 104 starts the voice recognition process on the basis of the received sound information. At this time, the start point of time T3 of the voice recognition process is stored in the storage unit 106.

If the detection of the user operation is completed, the control unit 104 specifies the processing target point of time on the basis of the detection start point of time of the user operation. Specifically, the control unit 104 specifies the point of time closer to the start point of time of the voice recognition process than other points of time among the points of time at which the line-of-sight information is obtained. For example, the control unit 104 selects t-6 which is closer to the time T3 out of the line-of-sight detection timings t-6 and t-5 temporally close to the time T3 stored in the storage unit 106.

Then, the control unit 104 decides the operation position using the line-of-sight information obtained at the specified point of time. For example, the control unit 104 decides the position corresponding to the line-of-sight position specified from the line-of-sight information obtained in the line-of-sight detection process of the selected t-6 as the operation position.

As described above, according to the second modified example of the present embodiment, the reference point of time includes the detection start point of time of the user operation. Therefore, in a case in which the time lag between the operation target position recognition and the operation start is large, it is possible to reduce a possibility that the uncomfortable feeling will be given to the user as compared with the case in which the recognition point of time of the operation target position is used as the reference point of time, (Third Modified Example)

As a third modified example of the present embodiment, the reference point of time may be a point of time related to the start of the user operation. Specifically, the control unit 104 estimates the point of time related to the start of the user operation on the basis of a motion of an object used for the user operation. Further, a process of the present modified example will be described in detail with reference to FIG. 3. Further, description of processes that are substantially the same as those described above is omitted.

As described above, in general, a behavior of the user of performing an operation is performed in the order of recognition of the operation target position and execution of the operation. Here, the operation position decision process focused on the point of time at which the operation is executed, that is, the point of time prior to the operation detection start point of time after the operation target position is recognized will be described.

First, the control unit 104 continuously performs a process of observing the user. Specifically, the control unit 104 detects a predetermined motion of an object used for the user operation on the basis of information identifying a motion of the user (hereinafter also referred to as "user motion information").

More specifically, the control unit 104 acquires, as the user motion information, image information related to an image in which the user is a subject (hereinafter referred to as "user image information") from an external device such as the line-of-sight detecting device 200 at predetermined time intervals via communication. Then, the control unit 104 decides a motion of the mouth of the user on the basis of the user image information. In a case in which the motion of the mouth of the user is a motion related to a start of speaking, the control unit 104 stores an acquisition point of time of the user image information in the storage unit 106 as the reference point of time.

For example, the motion related to the start of the speaking of the user is performed between the recognition point of time of the operation target position of the user, that is, the time T1 illustrated in FIG. 3 and the point of time at which the speaking starts to be detected, that is, the time T3 illustrated in FIG. 3. Therefore, the acquisition point of time of the user image information stored as the reference point of time may be later than the time T2 at which the line of sight is determined to be stopped.

Then, if the trigger information is obtained, the control unit 104 detects the user operation.

If the detection of the user operation is completed, the control unit 104 specifies the processing target point of time on the basis of a detection point of time of a predetermined motion. For example, the control unit 104 specifies a point of time closer to the acquisition point of time of the user image information than other points of time among the points of time at which the line-of-sight information is obtained.

Then, the control unit 104 decides the operation position using the line-of-sight information obtained at the specified point of time.

In the above example, the user motion information is the user image information, but the user motion information may be sensor information obtained from a myoelectric sensor, an acceleration sensor, an angular velocity sensor, or the like attached to the user. In this case, the presence or absence of the predetermined motion of the body such as the mouth or the arm of the user is determined on the basis of the acquired sensor information.

In the above example, the point of time related to the start of the user operation is the point of time estimated on the basis of the motion of the object used for the user operation, but the point of time related to the start of the user operation may be a point of time estimated on the basis of a brain wave. For example, the control unit 104 obtains information related to the brain waves of the user who performs an operation via communication. Then, in a case in which a predetermined brain wave pattern is included in a brain waves specified from the information related to the obtained brain waves, the control unit 104 stores the acquisition point of time of the information related to the brain wave in the storage unit 106 as the reference point of time. For example, the predetermined brain wave pattern may be a pattern of a brain wave generated when it is desired to perform speaking or a gesture.

As described above, according to the third modified example of the present embodiment, the reference point of time includes the point of time related to the start of the user operation. Therefore, since the reference point of time is brought closer to the point of time intended by the user as compared with the case in which the detection start point of time of operation is used as the reference point of time, it is possible to further lower a possibility of the uncomfortable feeling being given to the user.

The point of time related to the start of the user operation is estimated on the basis of the motion of the object used for the user operation. Therefore, since the start of the user operation is estimated more accurately, it is possible to improve a possibility that the operation position will be decided as the position intended by the user.

(Fourth Modified Example)

As the fourth modified example of the present embodiment, the reference point of time may be selected from points of time prior to the detection start of the user operation on the basis of predetermined information. Specifically, the control unit 104 selects one of the points of time related to the recognition of the user for the operation target position and the point of time related to the detection start of the user operation as the reference point of time on the basis of predetermined information.

More specifically, in a case in which the recognition of the user for the operation target position is not detected, the control unit 104 selects the detection start point of time of the user operation as the reference point of time. For example, in a case in which the line-of-sight detection is not performed due to blinking of the user or the like when the line of sight of the user stops, and thus the line-of-sight information is not acquired, the control unit 104 selects the start point of time of the voice recognition process as the reference point of time.

Further, the control unit 104 may select the reference point of time on the basis of information related to a time length between the user recognition point of time and the point of time related to the detection start of the user operation. For example, in a case in which the time length between the time T2 which is the user recognition point of time illustrated in FIG. 3 and the time T3 which is the detection start point of time of the user operation is shorter than a predetermined length, the control unit 104 selects the user recognition point of time as the reference point of time. In a case in which the time length is longer than the predetermined length, the control unit 104 selects the detection start point of time of the user operation as the reference point of time. For example, in a case in which the line of sight is determined not to be stopped within a predefined period of time immediately before the detection of the user operation, and a line-of-sight stop determination point of time prior to the predetermined period of time is used, the time length between the previous line-of-sight stop determination point of time and the detection start point of time of the user operation may be longer than the predetermined length. In this case, the detection starts point of time of the user operation is selected as the reference point of time.

Further, the control unit 104 may select the reference point of time on the basis of information related to a type of user operation. Specifically, if the trigger information is received, the control unit 104 selects the reference point of time corresponding to a type of trigger, that is, a type of user operation. For example, an operation using a sound is associated with the point of time related to the recognition of the user, and the associated information is stored in the storage unit 106.

Further, the control unit 104 may select the reference point of time on the basis of information related to the target of the user operation. Specifically, the information related to the target of the user operation is a type of target of the user operation. For example, the target of the user operation is an application, content, a screen, an object, or the like, and for example, in a case in which the type of application serving as the target of the user operation is an action type game application, the user recognition point of time is used as the reference point of time.

Further, the information related to the target of the user operation may be information that varies in accordance with the number of targets of the user operation. For example, in a case in which the user operation is a selection operation, when the number of choices is greater than a predetermined number, the point of time related to the start of the user operation is selected.

Further, the control unit 104 may select the reference point of time on the basis of a user setting. Further, setting content may be stored in the storage unit 106 or a setting may be changed.

As a choice, the point of time related to the start of the user operation may be added to the user recognition point of time and the point of time related to the detection start of the user operation.

As described above, according to the fourth modified example of the present embodiment, the reference point of time is selected from the points of time prior to the detection start of the user operation on the basis of the predetermined information. Therefore, since the reference point of time suitable for the situation is selected, it is possible to further suppress the occurrence of the uncomfortable feeling of the user.

Further, the reference point of time includes one point of time selected on the basis of predetermined information out of the point of time related to the recognition of the user for the operation target position serving as the target of the user operation and the point of time related to the detection start of the user operation. Therefore, since the choices are narrowed down, it is possible to simplify the process of selecting the reference point of time.

Further, the predetermined information includes information related to a time length between the point of time related to the recognition of the user and the point of time related to the detection start of the user operation. For this reason, since an inappropriate reference point of time is suppressed from being selected when an abnormality occurs, for example, a case in which the detection of the user recognition fails, it is possible to suppress a process obviously deviated from the intention of the user from being performed.

Further, the predetermined information includes the type of user operation. Therefore, since the reference point of time suitable for the user operation is selected, it is possible to improve the operability.

Further, the predetermined information includes information related to the target of the user operation. Thereafter, since the reference point of time is selected in accordance with the target of the user operation, it is possible to suppress a variation in operability depending on the operation target even in the same user operation, and it is possible to improve a degree of satisfaction of the user for the operability.

(Fifth Modified Example)

As a fifth modified example of the present embodiment, the feedback object may be superimposedly displayed after a predetermined point of time (hereinafter also referred to as a "subsequent point of time") later than the reference point of time is passed. Specifically, the control unit 104 decides the candidate position on the basis of the reference point of time, and then causes the feedback object to be displayed superimposed on an image at the candidate position decided on the basis of the reference point of time at the subsequent point of time that is a candidate for the reference point of time.

For example, in a case in which the user recognition point of time is the reference point of time, the control unit 104 decides the candidate position on the basis of the point of time at which the user recognition is detected but does not cause the feedback object to be displayed superimposed on the image. Thereafter, when the trigger information is received, and the detection of the user operation based on the trigger information is started, the control unit 104 causes the feedback object to be displayed at the candidate position previously decided on the basis of the user recognition point of time.

In this case, since the feedback object is not superimposedly displayed before the detection of the User operation is started, the visibility of the screen is hardly obstructed.

Further, since the operation position, that is, the candidate position is decided on the basis of the user recognition point of time, it is possible to cause the marking object to be displayed superimposed on the position closer to the position intended by the user than the operation position decided using the detection start point of time of the user operation as the reference point of time.

Further, a display timing of the feedback object may be selected from the reference point of time or the subsequent point of time or may be decided in advance in accordance with a user setting or the like. It will be appreciated that the display timing of the feedback object may be changed later.

As described above, according to the fifth modified example of the present embodiment, the feedback object is superimposedly displayed after the predetermined later than the reference point of time is passed. For this reason, since the feedback object is superimposedly displayed after the reference point of time, and the feedback object is displayed superimposed on the screen for a long time, it is possible to suppress degradation in the visibility of the screen.

Further, the predetermined point of time is a point of time which is a candidate for the reference point of time. For this reason, since the feedback object is not superimposedly displayed at a timing unnatural for the user, it is possible to reduce a possibility of the uncomfortable feeling being given to the user by displaying the feedback object.

In a case in which the feedback object is superimposedly displayed on the basis of the reference point of time, the following merits are obtained.

For example, in a case in which the user recognition point of time is the reference point of time, since the feedback object is superimposedly displayed prior to any other point of time for the user's intention, it is possible for the user to have time enough to adjust the position before the operation position is decided.

Further, for example, in a case in which the detection starts point of time of the user operation is the reference point of time, since a display period of time of the feedback object is shorter than that of the modified example, it is possible to suppress degradation in the visibility of the screen.

(Sixth Modified Example)

As a sixth modified example of the present embodiment, it may be switched whether or not the operation position decision function is operated. Specifically, the control unit 104 selects the line-of-sight information used for the decision of the operation position from the line-of-sight information obtained at the processing target point of time or the line-of-sight information obtained at a detection end point of time of the user operation.

More specifically, the information related the target of the user operation is the type of target of the user operation as described above. For example, the target of the user operation may be an application, content, a screen, an object, or the like. For example, in a case in which the type of application serving as the target of the user operation is an action type game application, since it is unlikely that there is hesitation in performing the user operation, the control unit 104 turns on the operation position decision function, that is, decides the operation position on the basis of the line-of-sight information obtained at the processing target point of time.

On the other hand, for example, in a case in which the type of content serving as the target of the user operation is selective type content, since there may be hesitation in performing the user operation, or a selection destination may be changed during the user operation, the control unit 104 turns on the operation position decision function, that is, decides the operation position on the basis of the line-of-sight information obtained at the detection endpoint of time of the user operation.

Further, the control unit 104 may select the line-of-sight information used for the decision of the operation position on the basis of a time taken for the user operation. For example, the control unit 104 turns off the operation position decision function in a case in which a time length from the detection start of the user operation to the detection end is longer than a predetermined length. The time length may start from the user recognition point of time.

As described above, according to the sixth modified example of the present embodiment, the information processing apparatus 100-1 selects the line-of-sight information used for the decision of the operation position from the line-of-sight information obtained at the processing target point of time or the line-of-sight information obtained at the detection end point of time of the user operation on the basis of the information related to the target of the user operation. Therefore, in a case in which it is likely to take time to perform the user operation, the operation position decision function is turned off, and thus it is possible to reduce the possibility of the uncomfortable feeling being given to the user.

Further, the information processing apparatus 100-1 selects the line-of-sight information used for the decision of the operation position from the line-of-sight information obtained at the processing target point of time or the line-of-sight information obtained at the detection end point of time of the user operation on the basis of the time taken for the user operation. Therefore, since it is selected whether or not the operation position decision function is used using the actual user operation time, it is possible to achieve both the convenience of the user and the suppression of the uncomfortable feeling given to the user.

<3. Second embodiment of present disclosure (marking in outside world image)>

The information processing apparatus 100-1 according to the first embodiment of the present disclosure has been described above. Subsequently, an information processing apparatus 100-2 according to a second embodiment of the present disclosure will be described. In the second embodiment, the marker object is superimposed on an outside world image.

<3-1. Configuration of device>

Figure 8:
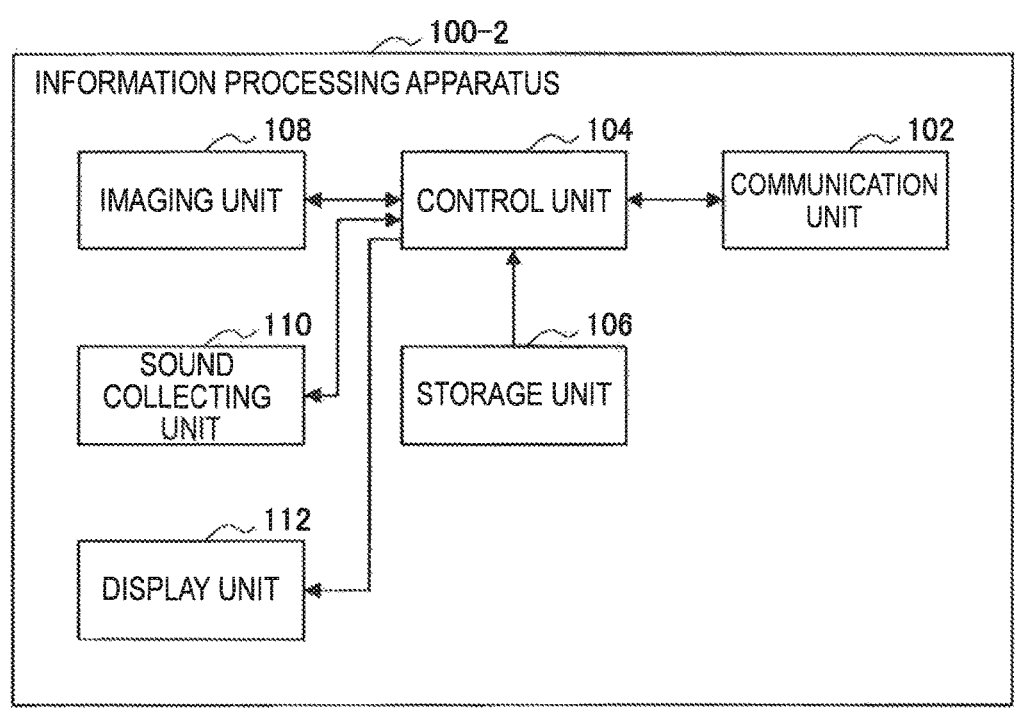
FIG. 8 is a block diagram illustrating a schematic functional configuration of an information processing apparatus according to a second embodiment of the present disclosure.

First, the functional configuration of the information processing apparatus 100-2 according to the second embodiment of the present disclosure will be described with reference to FIG. 8. FIG. 8 is a block diagram illustrating a schematic functional configuration of the information processing apparatus 100-2 according to the present embodiment. Further, description of functions that are substantially the same as those of the first embodiment will be omitted.

As illustrated in FIG. 8, the information processing apparatus 100-2 includes an imaging unit 108, a sound collecting unit 110, and a display unit 112 in addition to the communication unit 102, the control unit 104, and the storage unit 106. For example, the information processing apparatus 100-2 may be a wearable device or the like worn on the head of a human body.

A function of the control unit 104 according to the present embodiment is different from that of the first embodiment in that a target on which the marker object is superimposedly displayed is an outside world image rather than an image. Specifically, the control unit 104 causes the marker object to be displayed superimposed on the outside world image by causing the marker object to be displayed on the display unit 112 that transmits light related to the outside world image. An operation position decision function, an operation position marking function, a marking sharing function, a line-of-sight detection function, and a trigger detection function will be described below. An operation position prior notification function substantially the same as that of the first embodiment.

(Operation position decision function and operation position marking function)

Figure 9:
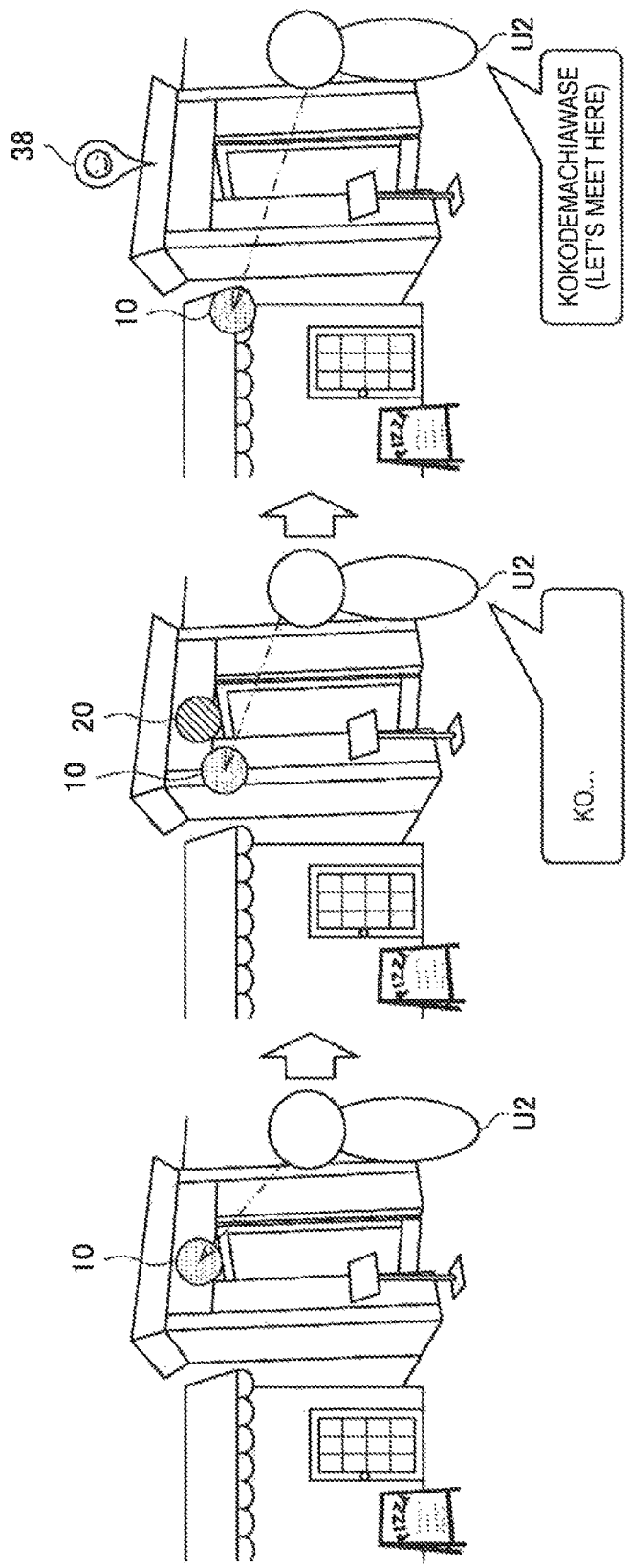
FIG. 9 is a diagram illustrating an application example of an information processing system according to the embodiment.

The control unit 104 estimates a position and an ambient space of the information processing apparatus 100-2, and decides the operation position on the basis of the estimated position and space (hereinafter also referred to as a "device ambient environment"), the line-of-sight information, and the trigger information. Specifically, the control unit 104 estimates the position and the ambient space of the information processing apparatus 100-2 on the basis of acquired sensor information, and specifies the processing target point of time specified on the basis of the estimated device surrounding environment and the reference point of time. Then, if predetermined trigger information is acquired, the control unit 104 decides the operation position on the basis of the line-of-sight information obtained at the specified processing target point of time. A process of the control unit 104 according to the present embodiment will be described in detail with reference to FIG. 9. FIG. 9 is a diagram illustrating an application example of the information processing system according to the present embodiment.

The control unit 104 estimates device surrounding information on the basis of the sensor information. For example, the control unit 104 estimates the device surrounding environment on the basis of information obtained from an imaging sensor (the imaging unit 108), a ranging sensor, or the like. An environment map may be generated on the basis of the sensor information. For the estimation of the operation position, techniques related to space recognition and position identification such as simultaneous localization and mapping (SLAM) may be used.

Further, the control unit 104 acquires the line-of-sight information. For example, the control unit 104 acquires line-of-sight information indicating a line of sight of a user U2 illustrated in a left diagram of FIG. 9 via the communication unit 102.

Then, if the line-of-sight information is obtained, the control unit 104 causes the display unit 112 to display a line-of-sight object indicating a line-of-sight position specified from the estimated device surrounding environment and the line-of-sight information. For example, the control unit 104 specifies the line-of-sight position from the operation position and the line-of-sight information, and generates an image in which the line-of-sight object 10 is displayed superimposed on the specified line-of-sight position. Then, the control unit 104 causes the display unit 112 to display the generated image. Accordingly, the line-of-sight object 10 illustrated in the left diagram of FIG. 9 is viewed superimposed on the outside world image for the user viewing the outside world image through the display unit 112.

Further, the control unit 104 determines the presence or absence of the user recognition on the basis of the line-of-sight information. For example, the control unit 104 performs the line-of-sight stop determination on the basis of a plurality of pieces of line-of-sight information of the user U2.

Then, the control unit 104 causes the feedback object to be displayed superimposed on the candidate position decided on the basis of the determination result on the presence or absence of the user recognition. For example, if the line of sight of the user U2 is determined to be stopped, the control unit 104 decides a position of the line-of-sight object 10 illustrated in the left diagram of FIG. 9 as the candidate position, and causes the feedback object 20 to be displayed superimposed on the candidate position as illustrated in a middle diagram of FIG. 9.

Then, if the trigger information is acquired, the control unit 104 starts the detection of the user operation on the basis of the trigger information. For example, if the sound information is obtained from the sound collecting unit 110, the control unit 104 starts the voice recognition process on the basis of the sound information.

If the detection of the user operation ends, the control unit 104 decides the position corresponding to the candidate position as the operation position in a case in which the detected user operation is a predetermined user operation. For example, the control unit 104 determines whether or not the keyword "koko (here)" illustrated in the left diagram of FIG. 9 is included in a result of the voice recognition process. If the keyword is determined to be included in the result of the voice recognition process, the control unit 104 decides the position corresponding to the candidate position, that is, the position at which the feedback object 20 illustrated in the middle diagram of FIG. 9 is superimposedly displayed as the operation position.

Then, the control unit 104 causes the marker object to be displayed superimposed on the outside world image at the decided operation position. For example, if the operation position is decided, the control unit 104 arranges a marker object 38 illustrated in a right diagram of FIG. 9 to indicate the position corresponding to the operation position of the screen of the display unit 112. Then, the control unit 104 causes the display unit 112 to display the image in which the marker object 38 is arranged and causes the marker object 38 to be displayed superimposed on the outside world image.

(Marking sharing function)

Figure 10:
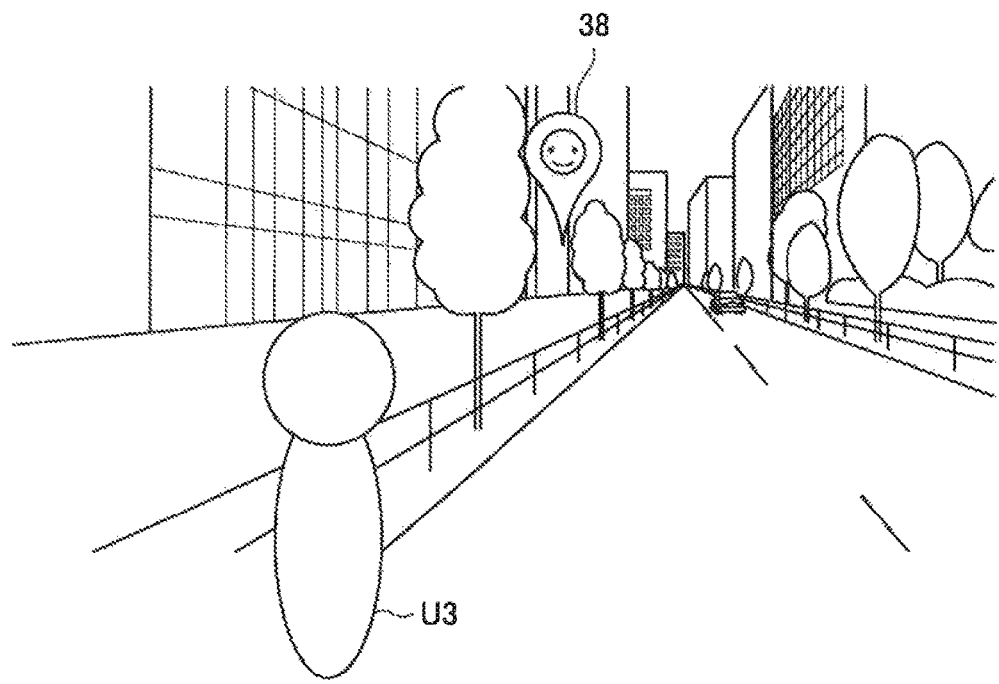
FIG. 10 is a diagram for describing a marker information sharing process of the information processing apparatus according to the embodiment.

The control unit 104 provides information of the marker object (hereinafter also referred to as "marker information") to another information processing apparatus via the communication unit 102. Further, the sharing of the marker information will be described in detail with reference to FIG. 10. FIG. 10 is a diagram for describing a marker information sharing process of the information processing apparatus 100-2 according to the present embodiment.

For example, the marker information related to the marker object 38 is transmitted to another information processing apparatus held by a user U3 illustrated in FIG. 10 via a server connected to the information processing apparatus 100-2 or directly. Then, another information processing apparatus causes the marker object 38 to be superimposed on the outside world image illustrated in FIG. 10 by causing the display unit to display the marker object 38 on the basis of the shared marker information.

Further, if another information processing apparatus approaches a position at which the marker object is superimposed, the information processing apparatus 100-2 may provide the marker information to another information processing apparatus. For example, the control unit 104 acquires position information of another information processing apparatus through the communication unit 102 and determines whether or not another information processing apparatus is positioned within a predetermined range from the marking position. In a case in which another information processing apparatus is determined to be positioned within the predetermined range, the control unit 104 provides the marker information to another information processing apparatus.

(Line-of-sight detection function and trigger detection function) The control unit 104 includes a line-of-sight detection function of the line-of-sight detecting device 200 and the sound detection function of the sound detecting device 300 in the first embodiment.

The description of the configuration of the information processing apparatus 100-2 is continued with reference to FIG. 8, and the imaging unit 108 performs two types of imaging. Specifically, the imaging unit 108 performs imaging for an area around the information processing apparatus 100-2 and imaging for line-of-sight detection. For example, the imaging unit 108 includes a first imaging unit that performs imaging for an area around the information processing apparatus 100-2 and a second imaging unit that performs imaging for line-of-sight detection. Since the first imaging unit is substantially the same as the imaging unit 206 of the line-of-sight detecting device 200 in the first embodiment, description thereof is omitted. The second imaging unit images the eyes of the user wearing the information processing apparatus 100-2 and surroundings thereof and provides an image obtained by the imaging to the control unit 104.

The sound collecting unit 110 collects sounds around the information processing apparatus 100-2. Since a function of the sound collecting unit 110 is substantially the same as the function of the sound collecting unit 306 of the sound detecting device 300 in the first embodiment, description thereof is omitted.

The display unit 112 displays the image on the basis of an instruction given from the control unit 104. Specifically, the display unit 112 has a structure in which external light to be transmitted and image light are incident on the eyes of the user, and emits image light related to the image provided from the control unit 104 so that the image light is incident on the eyes of the user. For example, the display unit 112 projects an image onto a display which is installed separately or the like, or directly emits the image light to the eyes of the user.

<3-2. Process of device>

A process of the information processing apparatus 100-2 according to the second embodiment of the present disclosure is substantially the same as the process of the first embodiment except for a device surrounding environment estimation process, and thus description thereof is omitted.

<3-3 Conclusion of second embodiment>

As described above, according to the second embodiment of the present disclosure, the information processing apparatus 100-2 the display object to be displayed superimposed on the outside world image. Thus, since the marker object is displayed superimposed on the real space, the user is able to perform marking on the real space without changing the real space.

Further, the marker information is shared with other information processing apparatuses. Therefore, since the marker object is shared to be seen by other people, it is possible to more smoothly perform communication with other people in the user's daily life.

<3-4. Modified examples>

The second embodiment of the present disclosure has been described above. The present embodiment is not limited to the above example. First and second modified examples of the present embodiment are described below.

(First Modified Example)

Figure 11:
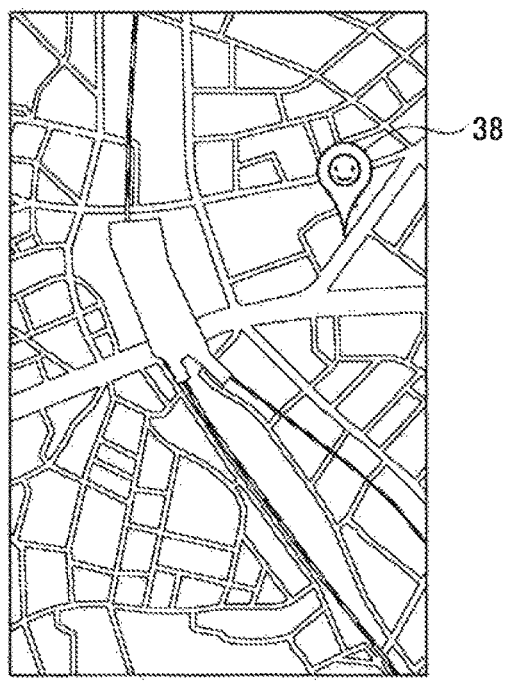
FIG. 11 is a diagram illustrating an example of a map information associated with marker information in a first modified example of the embodiment.

As the first modified example of the present embodiment, the marker information may be associated with a map information. Specifically, the control unit 104 associates the decided operation position, that is, the position at which the marker object is superimposed with a position in the map information, and generates information indicating the association. Further, a process of the present modified example will be described with reference to FIG. 11. FIG. 11 is a diagram illustrating an example of the map information associated with the marker information in the first modified example of the present embodiment.

For example, if the operation position is decided, and the marker object is displayed superimposed on the outside world image, the control unit 104 associates the operation position, that is, the position at which the marker object is superimposed with coordinates in the map information. The coordinates in the map information may be coordinates obtained from a global positioning system (GPS) sensor.

Then, the control unit 104 causes the display unit 112 to display the map information illustrated in FIG. 11 on the basis of the user operation or the like. For example, the marker object 38 is displayed at the map information as the display object indicating the position at which the marker object is superimposed. The display object displayed at the map information may be a display object different from the marker object.

The map information associated with the position at which the marker object is superimposed or the association information may be shared with other information processing apparatuses.

As described above, according to the first modified example of the present embodiment, the marker information is associated with the map information. Therefore, the user can check the position at which the marker object is superimposed at a bird's-eye view, and thus the convenience of the user can be improved.

(Second Modified Example)

As a second modified example of the present embodiment, the user operation may be an operation using the gesture of the user (hereinafter also referred to as a "gesture operation"). More specifically, the control unit 104 detects the gesture operation on the basis of the image having the user as the subject obtained by the imaging performed by the imaging unit 108. For example, the gesture operation is detected from the image having the user as the subject on the basis of a motion or a posture of a finger, a hand, an arm, or other parts of the user. For example, the gesture operation may be finger projection, fingertip rotation, nodding, eye spreading or blinking, or the like.

The gesture operation may be detected on the basis of information obtained from a sensor attached to the user. For example, the sensor attached to the user may be an acceleration sensor, an angular velocity sensor, a geomagnetic sensor, or the like. The sensor may be installed in a device operated by the user, for example, a game controller.

Further, the user operation may an operation of an input device. Specifically, the control unit 104 detects the operation of the input device on the basis of operation information obtained from the input device connected to the information processing apparatus 100-2. For example, if the operation information is obtained from the input device, the control unit 104 specifies an operation start point of time of the input device on the basis of a representative value of a time taken to obtain the operation of the input device, for example, an average value. Further, the user recognition point of time is specified by going back from the operation start point of time by the reaction time related to the operation of the input device. The control unit 104 performs a process using the operation start point of time or the user recognition point of time specified as described above. The input device may be an input device including a push button, a mouse, a touch panel, a pressure sensor, or a capacitive sensor.

As described above, according to the second modified example of the present embodiment, the user operation includes the operation using the gesture of the user. Therefore, even when it is difficult for the user to generate a sound, the user is able to intuitively specify the operation position, and thus the convenience of the user can be improved.

Further, the user operation includes the operation of the input device. Thus, the operation detection process is simplified as compared with the operation using the sound or the gesture operation, and thus the processing period of time can be reduced.

<4. Hardware Configuration of Information processing apparatus According to One Embodiment of Present Disclosure>

In the above, the information processing apparatus 100 according to each embodiment of the present disclosure has been described. The above process of the information processing apparatus 100 is achieved by the cooperation between software and hardware of the information processing apparatus 100 described below.

Figure 12:
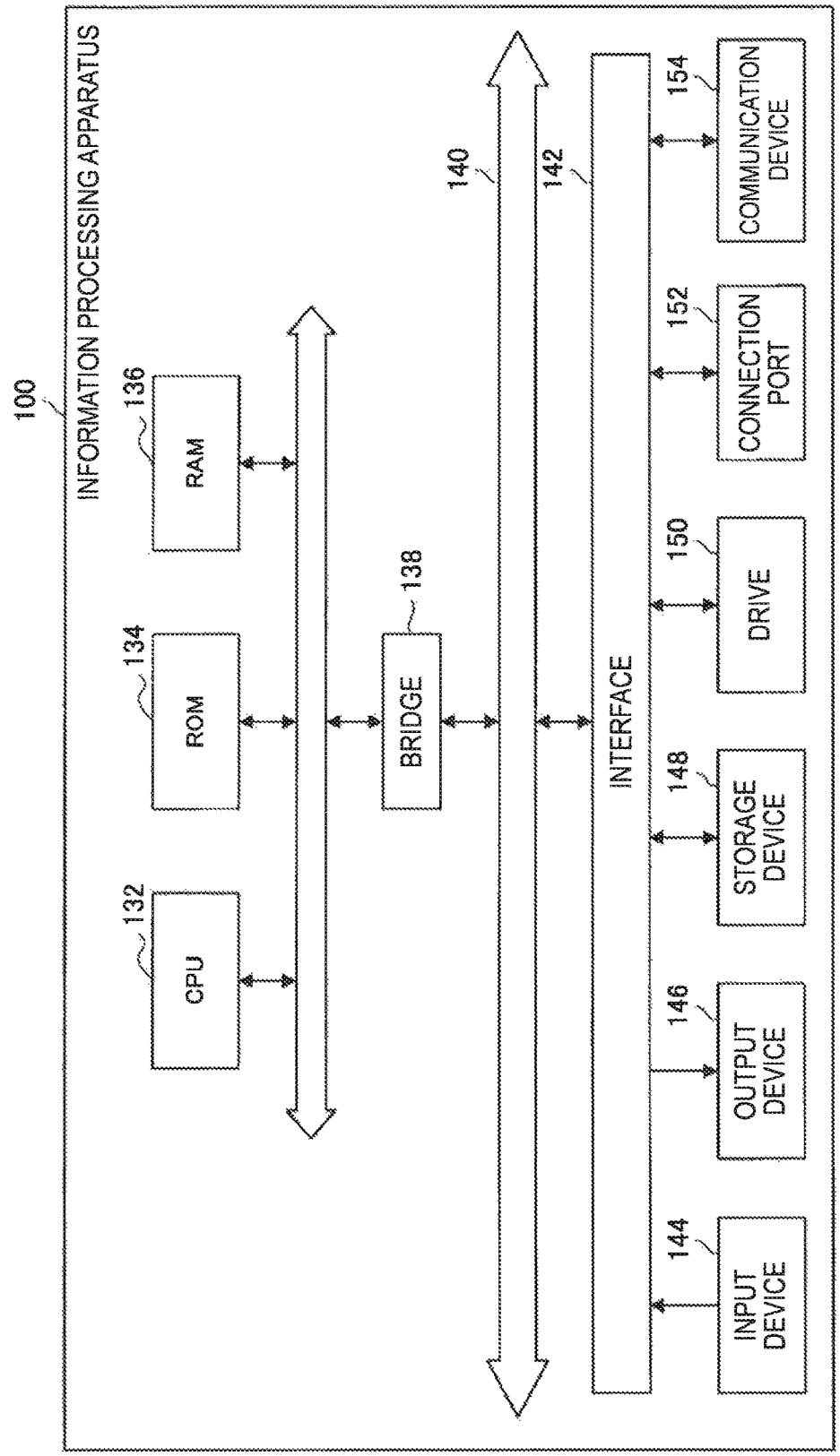
FIG. 12 is an explanatory diagram illustrating a hardware configuration of an information processing apparatus according to one embodiment of the present disclosure.

FIG. 12 is an explanatory diagram that illustrates a hardware configuration of the information processing apparatus 100 according to an embodiment of the present disclosure. As illustrated in FIG. 12, the information processing apparatus 100 includes a central processing unit (CPU) 132, a read only memory (ROM) 134, a random access memory (RAM) 136, a bridge 138, a bus 140, an interface 142, an input device 144, an output device 146, a storage device 148, a drive 150, a connection port 152, and a communication device 154.

The CPU 132 functions as a computation processing device, and cooperates with various types of programs to achieve the operation of the control unit 104 in the information processing apparatus 100. Also, the CPU 132 may be a microprocessor. The ROM 134 stores programs, calculation parameters, or the like, used by the CPU 132. The RAM 136 temporarily stores the programs used in the execution of the CPU 132 or the parameters that change as appropriate in the execution, for example. The ROM 134 and the RAM 136 constitute a part of the storage unit 106 in the information processing apparatus 100. The CPU 132, the ROM 134, and the RAM 136 are connected to each other via an internal bus configured with a CPU bus or the like.

For example, as examples of the imaging unit 108 and the sound collecting unit 110 of the information processing apparatus 100, the input device 144 is configured with an input means for the user to input information, such as a mouse, a keyboard, a touch panel, a button, a microphone, a switch, and a lever, and an input control circuit that generates an input signal on the basis of an input by a user and outputs the input signal to the CPU 132, tier example. The user of the information processing apparatus 100 can input various types of data to the information processing apparatus 100 and instruct the processing operation, by operating the input device 144.

For example, as an example of the display unit 112 of the information processing apparatus 100, the output device 146 performs outputting to a device such as a liquid crystal display (LCD) device, an organic light emitting diode (OLED) device, and a lamp, for example. Further, the output device 146 may perform sound outputting of a speaker, a headphone, and the like.

The storage device 148 is a device for data storage. The storage device 148 may include a storage medium, a record device that records data in the storage medium, a reading device that reads out data from the storage medium, a deleting device that deletes the data recorded in the storage medium, and the like. The storage device 148 stores the programs executed by the CPU 132 and various types of data.

The drive 150 is a reader/writer for the storage medium, and is provided inside or externally attached to the information processing apparatus 100. The drive 150 reads out the information recorded in a removable storage medium, such as a magnetic disk, an optical disc, a magneto-optical disk, or a semiconductor memory, which is put in the drive 150, and outputs the information to the RAM 134. Also, the drive 150 can write information into the removable storage medium.

The connection port 152 is a bus for connecting to an information processing apparatus or a peripheral device outside the information processing apparatus 100, for example. Also, the connection port 152 may be a universal serial bus (USB).

The communication device 154 is a communication interface configured with a communication device for connecting to a network, as an example of the communication unit 102 of the information processing apparatus 100, for example. Also, the communication device 154 may be a wireless local area network (LAN) compatible communication device, may be a long term evolution (LTE) compatible communication device, or may be a wired communication device that performs wired communication.

<5. Conclusion>

As described above, according to the first embodiment of the present disclosure, even in a case in which the time lag occurs between the point of time at which the user recognizes the operation target position and the completion of the detection of the user operation, it is possible to suppress deviation between the operation position and the operation target position intended by the user which is caused by the time lag. As a result, it is possible to suppress the uncomfortable feeling of the user for the position at which the process related to the user operation is performed. According to the second embodiment of the present disclosure, the marker object is displayed superimposed on the real space, and thus the user is able to perform the marking on the real space without changing the real space.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiments, the line-of-sight stop determination process is based on the stop of the line of sight for the position, but the present technology is not limited to this example. For example, the line-of-sight stop determination process may be based on the stop of the line of sight for an object. The control unit 104 determines whether or not there is an object in front of the line of sight, and performs the line-of-sight stop determination for the object in a case in which there is an object in front of the line of sight. For example, in a case in which an object moves, it is determined whether or not the line of sight follows the movement of the object. In a case in which the line of sight is determined to follow, the line of sight is determined to be stopped.

In the above embodiment, the example in which the operation position is decided has been described, but the operation position decision process may be cancelled before the operation position is decided. For example, in a case in which the line of sight of the user is changed before the operation position is decided after the line of sight of the user is detected to be stopped, the operation position decision process related to the stop of the line of sight is canceled. The feedback object may be superimposedly displayed until the operation position decision process is canceled.

Further, in the above embodiments, the example in which the sound made by the user is the voice of the user has been described, but the sound made by the user may be a sound generated by an action of the user. For example, the sound generated by the motion of the user may be a sound generated by the user using his/her body such as finger snapping or a sound generated by the user operating an instrument or a device that generates a sound such as a musical instrument or a buzzer.

In the above embodiments, the example in which the line-of-sight information is the information indicating the line of sight, and the control unit 104 specifies the line-of-sight position has been described above, but the line-of-sight information may be information indicating the line-of-sight position. In this case, the line-of-sight position is specified by the line-of-sight detecting unit device 200 or the like. The line-of-sight information may be image information related to an image obtained by imaging performed in the line-of-sight detecting device 200, and in this case, the control unit 104 specifies the line-of-sight detection and the line-of-sight position.

In the above embodiments, the example in which the sound information is the information indicating the sound has been described, but the sound information may be information indicating whether or not the keyword is included. For example, the control unit 304 of the sound detecting device 300 determines whether or not the keyword is included in the collected sound, and in a case in which the keyword is included, sound information indicating that the keyword is spoken is generated. Then, if the sound information is received, the control unit 104 of the information processing apparatus 100 decides a position corresponding to the line-of-sight position as the operation position.

In the above embodiments, various forms of the feedback object and the marker object have been described, but various forms can be similarly employed for the line-of-sight object as well. Further, these display objects may be decided in advance by the information processing apparatus 100-1 or the user or may be changed by a setting change.

In the above embodiments, the example in which the marker object is displayed on the display device 400 installed outside the information processing apparatus 100 or the display unit 112 installed in the information processing apparatus 100 has been described, but the marker object may be projected on a wall surface, a ceiling, or the like. For example, the marker object may be projected on a windshield or a side glass of a vehicle.

Further, the information processing apparatuses 100 and the information processing systems according to the embodiments of the present disclosure may be applied to a medical field, an agriculture field, and an automobile field. For example, in the medical field, the marker object is displayed superimposed on an X-ray photograph or a magnetic resonance imaging (MRI) image by an information processing apparatus 100, or the marker object is displayed superimposed on a surgical video or an operating room space. In this case, according to the configurations of the embodiments of the present disclosure, a possibility that the marker object is displayed superimposed on a position not intended by the user is reduced, and thus information is shared correctly among medical staffs, and medical safety can be improved.

In the agricultural field, for example, marking is performed on a specific tree by the information processing apparatus 100, and a user who is different from the user who performs marking performs a farm work such as pesticide spraying using the marker object related to the marking as a mark. In this case, according to the configurations of the embodiments of the present disclosure, a possibility that a wrong position is marked is reduced, and thus work efficiency in the agriculture can be improved.

In the automobile field, for example, marking is performed on a landmark around a vehicle on the basis of an operation of a user sitting on a navigation sheet by the information processing apparatus 100. Then, the marker information related to the marking is shared by a driver via another information processing apparatus 100, and the driver drives the car in accordance with the marking. In this case, according to the configurations of the embodiments of the present disclosure, a possibility that a wrong position is marked is reduced, and thus a possibility that the driver gets lost and a possibility of the occurrence of an accident can be reduced.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, not only a process in which steps shown in the flowcharts of the above embodiments are performed in a time-series manner in accordance with a described sequence but also a process in which the steps are not necessarily processed in a time-series manner but are executed in parallel or individually is included. Also, it is self-evident that even steps processed in a time-series manner can be appropriately changed in sequence depending on circumstances.

Additionally, the present technology may also be configured as below.

(1)

An information processing apparatus, including:

an input unit configured to obtain line-of-sight information related to a line of sight of a user and a detection result of a user operation; and a position deciding unit configured to decide an operation position at which a process related to the user operation is performed, on the basis of the line-of-sight information obtained at a second point of time specified on the basis of a first point of time prior to a detection start of the user operation.

(2)

The information processing apparatus according to (1), further including a display control unit configured to perform display control of a display object for the operation position decided by the position deciding unit.

(3)

The information processing apparatus according to (2), in which the first point of time includes a point of time related to recognition of the user for an operation target position serving as a target of the user operation.

(4)

The information processing apparatus according to (3), in which the point of time related to the recognition of the user is estimated on the basis of a determination result of whether or not the line of sight of the user is stopped.

(5)

The information processing apparatus according to (3) or (4), in which the point of time related to the recognition of the user is estimated on the basis of a human reaction time for the user operation.

(6)

The information processing apparatus according to any one of (2) to (5), in which the first point of time includes a point of time related to a start of the user operation.

(7)

The information processing apparatus according to (6), in which the point of time related to the start of the user operation is estimated on the basis of a motion of an object used for the user operation.

(8)

The information processing apparatus according to any one oaf (2) to (7), in which the first point of time includes a point of time selected from points of time prior to a detection start of the user operation on the basis of predetermined information.

(9)

The information processing apparatus according to (8), in which the first point of time includes one point of time selected on the basis of the predetermined information out of a point of time related to recognition of the user for an operation target position serving as a target of the user operation and a point of time related to the detection start of the user operation.

(10)

The information processing apparatus according to (9), in which the predetermined information includes information related to a time length between the point of time related to the recognition of the user and a point of time related to a start of the user operation.

(11)

The information processing apparatus according to (9) or (10), in which the predetermined information includes information related to a type of the user operation or the target of the user operation.

(12)

The information processing apparatus according to any one of (2) to (11), in which the second point of time includes a point of time closer to the first point of time than other points of time among points of time at which the line-of-sight information is obtained.

(13)

The information processing apparatus according to any one of (2) to (12), in which the position deciding unit selects the line-of-sight information used for the deciding of the operation position from the line-of-sight information obtained at the second point of time or the line-of-sight information obtained at a detection end point of time of the user operation on the basis of information related to a target of the user operation or a time taken tor the user operation.

(14)

The information processing apparatus according to any one of (2) to (13),
in which the display control unit performs display control of a second display object in which a candidate position to be the operation position is specified, and
the second display object is displayed on the basis of the candidate position until the operation position is decided since the first point of time.

(15)

The information processing apparatus according to (14),
in which the second display object is visually changed with passage of time.

(16)

The information processing apparatus according to (15),
in which the second display object is displayed to change towards candidate position.

(17)

The information processing apparatus according to any one of (1) to (16),
in which the user operation includes an operation using a sound made by the user.

(18)

The information processing apparatus according to any one of (1) to (17),
in which the user operation includes an operation using a gesture of the user or an operation of an input device.

(19)

An information processing method, including:
obtaining, by an input unit, line-of-sight information, related to a line of sight of a user and a detection result of a user operation; and
deciding an operation position at which a process related to the user operation is performed, on the basis of the line-of-sight information obtained at a second point of time specified on the basis of a first point of time prior to a detection start of the user operation.

(20)

A program causing a computer to implement:
an input function of obtaining line-of-sight information related to a line of sight of a user and a detection result of a user operation; and
a position decision function of deciding an operation position at which a process related to the user operation is performed, on the basis of the line-of-sight information obtained at a second point of time specified on the basis of a first point of time prior to a detection start of the user operation.

REFERENCE SIGNS LIST 100 information processing apparatus
102 communication unit
104 control unit
106 storage unit
108 imaging unit
110 sound collecting unit
112 display unit
200 line-of-sight detecting device
300 sound detecting device
400 display device

The invention claimed is:

1. An information processing apparatus, comprising:
an input unit configured to obtain line-of-sight information related to a line of sight of a user and a detection result of a user operation; and
a position deciding unit configured to decide an operation position at which a process related to the user operation is performed, on the basis of the line-of-sight information obtained at a second point of time, the second point of time being specified on the basis of a first point of time prior to a point of time at which a start of the user operation has been detected,
wherein the first point of time includes a point of time selected from points of time prior to the point of time at which the start of the user operation has been detected, on the basis of predetermined information, and
wherein the input unit and the position deciding unit are each implemented via at least one processor.

2. The information processing apparatus according to claim 1, further comprising:
a display control unit configured to perform display control of a display object for the operation position decided by the position deciding unit,
wherein the display control unit is implemented via at least one processor.

3. The information processing apparatus according to claim 1,
wherein the first point of time includes a point of time related to recognition of the user for an operation target position serving as a target of the user operation.

4. The information processing apparatus according to claim 3,
wherein the point of time related to the recognition of the user is estimated on the basis of a stop determination result of the line of sight of the user.

5. The information processing apparatus according to claim 3,
wherein the point of time related to the recognition of the user is estimated on the basis of a human reaction time for the user operation.

6. The information processing apparatus according to claim 1,
wherein the first point of time includes a point of time related to a start of the user operation.

7. The information processing apparatus according to claim 6,
wherein the point of time related to the start of the user operation is estimated on the basis of a motion of an object used for the user operation.

8. The information processing apparatus according to claim 1,
wherein the first point of time includes one point of time selected on the basis of the predetermined information out of a point of time related to recognition of the user for an operation target position serving as a target of the user operation and the point of time at which the start of the user operation has been detected.

9. The information processing apparatus according to claim 8,
wherein the predetermined information includes information related to a time length between the point of time related to the recognition of the user and a point of time related to a start of the user operation.

10. The information processing apparatus according to claim 8,
wherein the predetermined information includes information related to a type of the user operation or the target of the user operation.

11. The information processing apparatus according to claim 1, wherein the second point of time includes a point of time closer to the first point of time than other points of time among points of time at which the line-of-sight information is obtained.

12. The information processing apparatus according to claim 1,
wherein the position deciding unit selects the line-of-sight information used for the deciding of the operation position from the line-of-sight information obtained at the second point of time or the line-of-sight information obtained at a detection end point of time of the user operation on the basis of information related to a target of the user operation or a time taken for the user operation.

13. The information processing apparatus according to claim 2,
wherein the display control unit performs display control of a second display object in which a candidate position which is a candidate for the operation position is specified, and
the second display object is displayed on the basis of the candidate position until the operation position is decided since the first point of time.

14. The information processing apparatus according to claim 13,
wherein the second display object is visually changed with passage of time.

15. The information processing apparatus according to claim 14,
wherein the second display object is displayed to change towards the candidate position.

16. The information processing apparatus according to claim 1,
wherein the user operation includes an operation using a sound made by the user.

17. The information processing apparatus according to claim 1,
wherein the user operation includes an operation using a gesture of the user or an operation of an input device.

18. An information processing method, comprising:
obtaining, by an input unit, line-of-sight information related to a line of sight of a user and a detection result of a user operation; and
deciding an operation position at which a process related to the user operation is performed, on the basis of the line-of-sight information obtained at a second point of time, the second point of time being specified on the basis of a first point of time prior to a point of time at which a start of the user operation has been detected,
wherein the first point of time includes a point of time selected from points of time prior to the point of time at which the start of the user operation has been detected, on the basis of predetermined information.

19. A non-transitory computer-readable medium having embodied thereon a program, which when executed by a computer causes the computer to execute a method, the method comprising:
obtaining line-of-sight information related to a line of sight of a user and a detection result of a user operation; and
deciding an operation position at which a process related to the user operation is performed, on the basis of the line-of-sight information obtained at a second point of time, the second point of time being specified on the basis of a first point of time prior to a point of time at which a start of the user operation has been detected,
wherein the first point of time includes a point of time selected from points of time prior to the point of time at which the start of the user operation has been detected, on the basis of predetermined information.

* * * * *